(12) United States Patent
Tam

(10) Patent No.: US 8,839,074 B2
(45) Date of Patent: Sep. 16, 2014

(54) ON CHIP DATA RECOVERY FOR NON-VOLATILE STORAGE

(75) Inventor: Eugene Tam, Saratoga, CA (US)

(73) Assignee: SanDisk Technologies Inc., Plano, TX (US)

(*) Notice: Subject to any disclaimer, the term of this patent is extended or adjusted under 35 U.S.C. 154(b) by 89 days.

(21) Appl. No.: 13/613,946

(22) Filed: Sep. 13, 2012

(65) Prior Publication Data

US 2014/0075259 A1    Mar. 13, 2014

(51) Int. Cl.
*G11C 29/00*    (2006.01)

(52) U.S. Cl.
USPC .......................... 714/763; 714/718; 711/155

(58) Field of Classification Search
CPC ........... G11C 16/3404; G11C 16/3409; G11C 16/3413; G11C 16/3481; C11C 16/3549; G06F 11/108
USPC ........... 714/6, 718, 763; 365/185.09; 711/155
See application file for complete search history.

(56) References Cited

U.S. PATENT DOCUMENTS

| | | | |
|---|---|---|---|
| 6,397,365 B1 | 5/2002 | Brewer et al. | |
| 7,301,807 B2 | 11/2007 | Khalid et al. | |
| 7,774,643 B2 | 8/2010 | Wang | |
| 8,099,652 B1 | 1/2012 | Alrod et al. | |
| 8,200,887 B2 | 6/2012 | Bennett | |
| 2008/0184082 A1* | 7/2008 | Oda et al. | 714/718 |
| 2008/0250270 A1 | 10/2008 | Bennett | |
| 2008/0288814 A1 | 11/2008 | Kitahara | |
| 2009/0164836 A1 | 6/2009 | Carmichael | |
| 2009/0327803 A1 | 12/2009 | Fukutomi et al. | |
| 2010/0268985 A1* | 10/2010 | Larsen et al. | 714/6 |
| 2011/0072222 A1* | 3/2011 | Wagner et al. | 711/155 |
| 2013/0170296 A1* | 7/2013 | Yun | 365/185.09 |

* cited by examiner

*Primary Examiner* — Sam Rizk
(74) *Attorney, Agent, or Firm* — Vierra Magen Marcus LLP

(57) ABSTRACT

Methods and devices for recovering data stored in a non-volatile storage device are provided. Data may be recovered for memory cells associated with a word line that cannot be read using ECC that was calculated based on the data stored on that word line. This allows recovery for situations such as a word line shorting to the substrate or two adjacent word lines shorting together. When programming memory cells associated with a group of word lines, parity bits may be calculated and stored in memory cells associated with an additional word line in the memory device. When reading memory cells associated with one of the word lines in the group, an otherwise unrecoverable error may occur. By knowing which word line is defective, its data may be recovered using the parity bits and the data of all of the other word lines in the group.

24 Claims, 26 Drawing Sheets

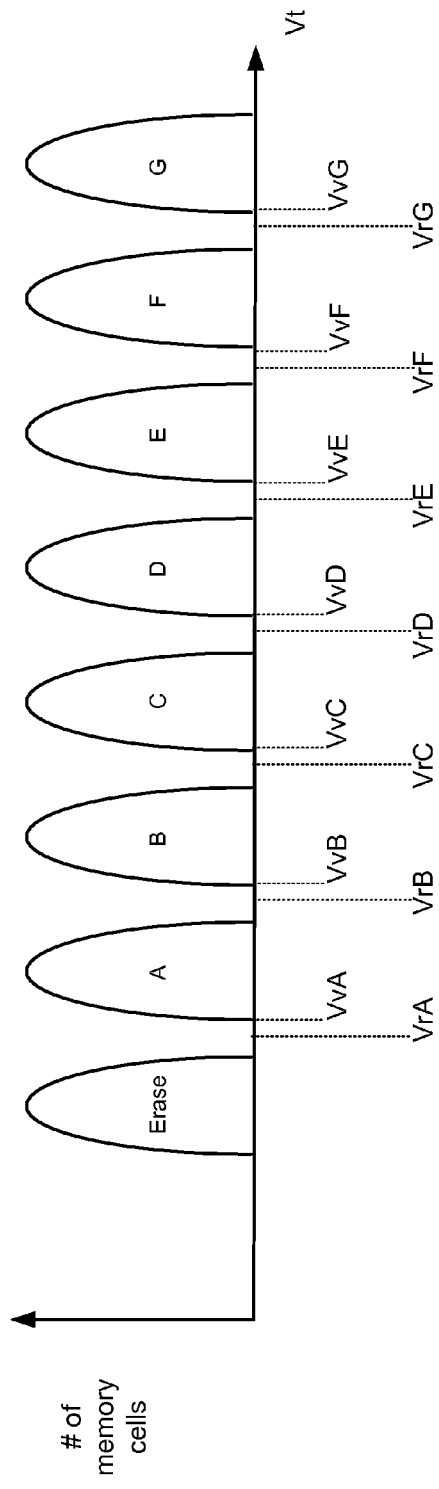
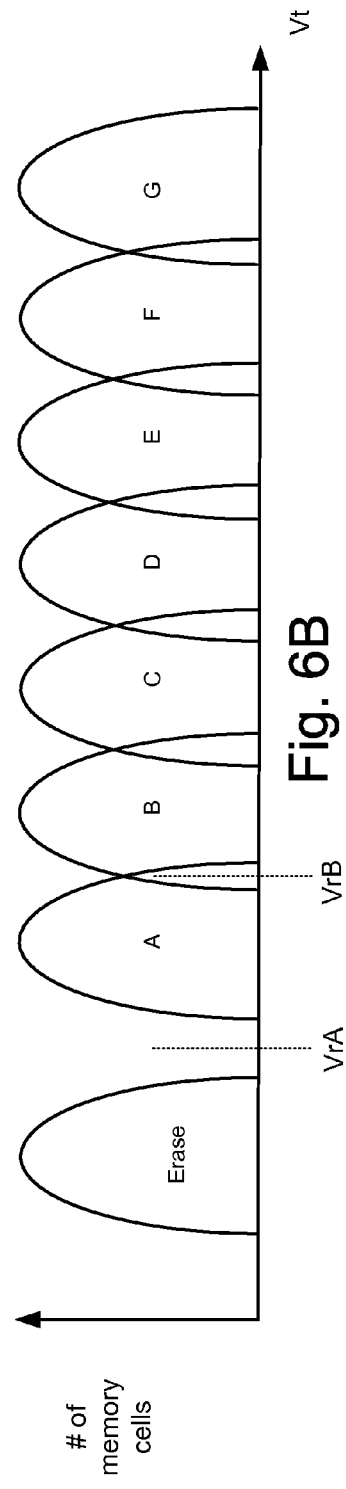

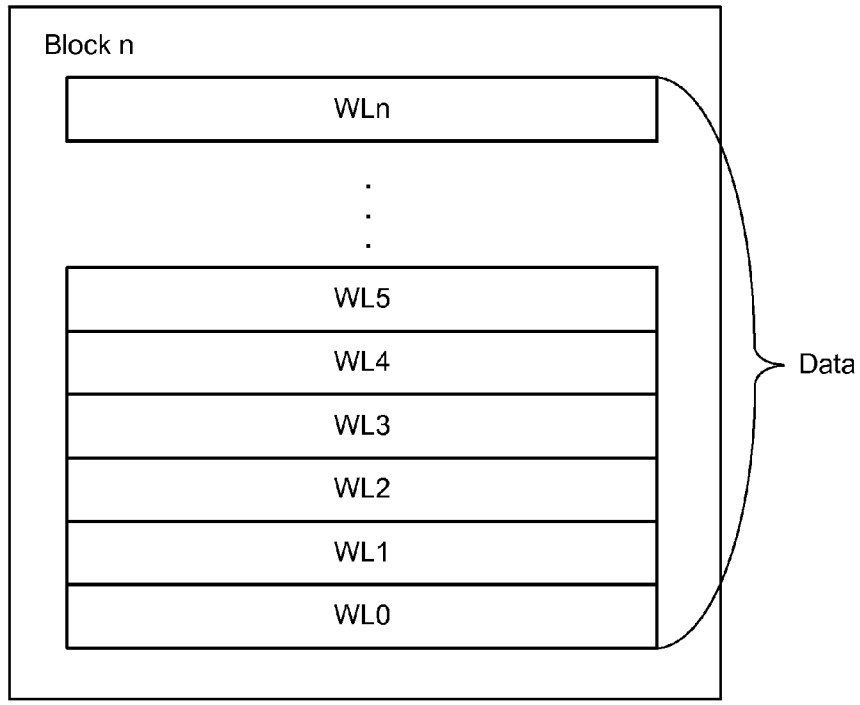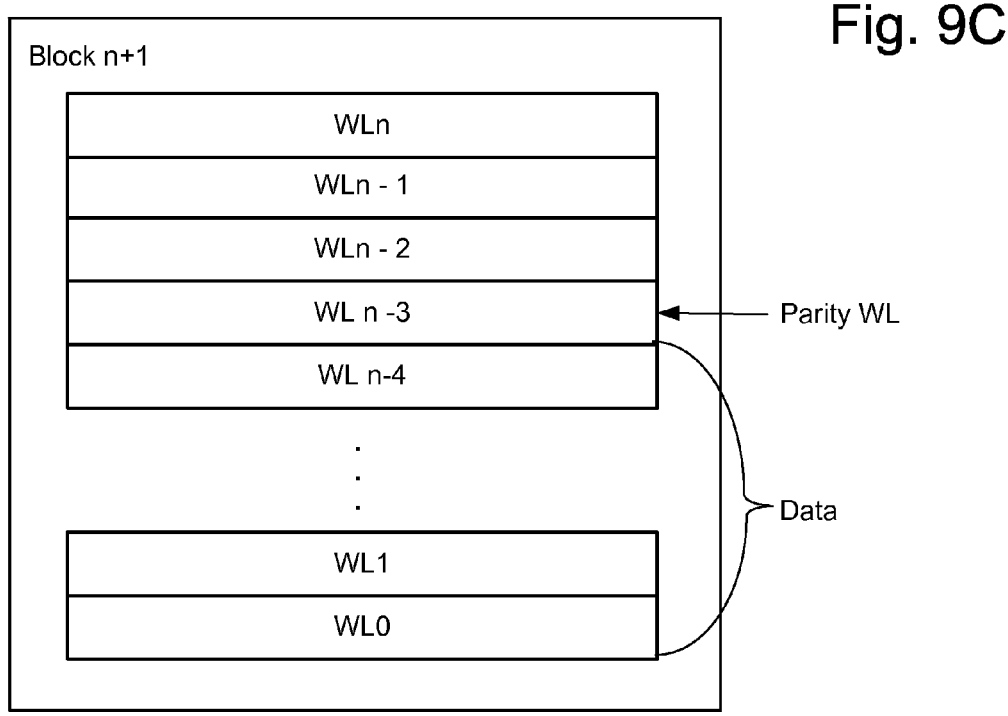
Fig. 9C

ON CHIP DATA RECOVERY FOR NON-VOLATILE STORAGE

BACKGROUND

The present disclosure relates to non-volatile storage.

Semiconductor memory has become increasingly popular for use in various electronic devices. For example, non-volatile semiconductor memory is used in cellular telephones, digital cameras, personal digital assistants, mobile computing devices, non-mobile computing devices and other devices. Electrically Erasable Programmable Read Only Memory (EEPROM) and flash memory are among the most popular non-volatile semiconductor memories. With flash memory, also a type of EEPROM, the contents of the whole memory array, or of a portion of the memory, can be erased in one step, in contrast to the traditional, full-featured EEPROM.

Both the traditional EEPROM and the flash memory utilize a floating gate that is positioned above and insulated from a channel region in a semiconductor substrate. The floating gate is positioned between the drain and source diffusion regions. A control gate is provided over and insulated from the floating gate. The threshold voltage ($V_{TH}$) of the transistor thus formed is controlled by the amount of charge that is retained on the floating gate. That is, the minimum amount of voltage that must be applied to the control gate before the transistor is turned on to permit conduction between its drain and source is controlled by the level of charge on the floating gate.

Groups of memory cells may be associated with a bit line. In one approach, memory cells are arranged as NAND strings, with each NAND string being associated with one bit line. A selected memory cell in the group may be sensed by applying a voltage to the selected memory cell and sensing a signal on the bit line. During programming, different voltages can be applied to the bit line to control the rate at which the selected memory cell programs.

Typically, a program voltage $V_{PGM}$ applied to the control gate is applied as a series of pulses that increase in magnitude as programming progresses. In one possible approach, the magnitude of the pulses is increased with each successive pulse by a predetermined step size, e.g., 0.2-0.4 V. In the periods between the program pulses, verify operations are carried out. That is, the programming level of each element of a group of cells being programmed in parallel is read between successive programming pulses to determine whether it is equal to or greater than a verify level to which the element is being programmed.

Typically, in addition to the data being programmed an Error Correction Code (ECC) that has been calculated from the user data is also stored. When the data is read back, the ECC is also read back. The ECC allows a certain number of misreads to be corrected even if it is not known which memory cells were misread. However, if there are too many misreads, then the ECC will be unable to correct the data. By storing more bits in the ECC, the recovery process can be made more robust. That is, more misreads can be corrected. However, this has the disadvantage of using additional memory cells to store the ECC.

BRIEF DESCRIPTION OF THE DRAWINGS

FIG. 6A depicts an example set of Vt distributions.

FIG. 6B depicts an example set of Vt distributions.

FIG. 9C shows one embodiment in which the group of word line associated with the parity word line cover more than one block.

DETAILED DESCRIPTION

Figure 1A:
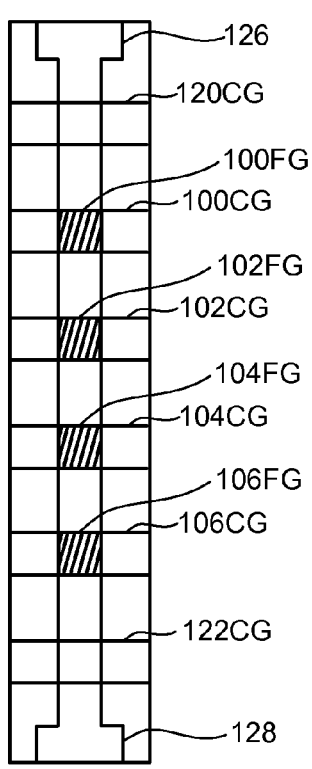
FIG. 1A is a top view of a NAND string.

The present disclosure provides methods and devices for operating non-volatile storage. Techniques for recovering data stored in a non-volatile storage device are provided. As will be discussed in the example below, in some non-volatile storage devices memory cells are associated with word lines. The memory cells may be programmed or read by applying suitable voltages to the word lines, along with other elements such as bit lines. Sometimes a word line will have a defect that prevents accurate reading of the word line even with ECC that is based on data stored on that word line. As one example, a short could develop between the word line and the substrate. This short might occur during or after programming the memory cells. Therefore, the memory cells might be programmed successfully, but cannot be read later on, even using the aforementioned ECC. Sometimes two adjacent word lines will short together after they have been programmed, which may prevent accurate reading of either word line even with ECC that is based on data stored on those two word lines. There are other conditions that may prevent a word line from being read even with ECC that is based on data stored on that word line.

Embodiments disclosed herein provide for a way to recover data stored in memory cells associated with a word line that cannot be read using ECC that was calculated based on the data stored on that word line. Therefore, even if the word line has a severe defect, such as a word line to substrate short, the data may be recovered.

Embodiments disclosed herein provide for a way to recover data stored in memory cells associated with two adjacent word lines that cannot be read using ECC that was calculated based on the data stored on those two word line. Therefore, even if the words line have a severe defect, such as a word line to word line short, the data may be recovered. Embodiments disclosed herein provide for recovery for defects other than word line to substrate shorts, and word line to word line shorts.

In one embodiment, when programming memory cells associated with a group of word lines parity bits are calculated and stored in memory cells associated with an additional word line in the memory device. When reading memory cells associated with one of the word lines in the group, an error that is unrecoverable using ECC based only on data for that word line may occur. This may be due to some defect along the word line such as a short between the word line and the substrate. By knowing which word line is defective, its data may be recovered using the parity bits and the data of all of the other word lines in the group. Therefore, only one additional word line (e.g., a parity word line) needs to be used to be able to recover from a situation in which a word line is defective. Note that even if additional bits of ECC codes based on the data stored only on the defective word line were to be used, then recovery still might not be possible.

As used herein, a phrase such as "programming a word line" means "programming memory cells associated with a word line." Likewise, a phrase such as "reading a word line" means "reading memory cells associated with a word line."

In one embodiment, a page of data is programmed onto each word line. As one example, each page might contain "n" bits of data. A total of "n" parity bits may be generated for the pages. Each parity bit is calculated based on the corresponding bit in all of the other pages. For example, the first bit of each page is used to determine a single parity bit. The "n" parity bits are then stored on some word line in the memory device. Note that when programming a given word line, ECC may be stored on that word line based on the data stored on that word line. If a single word line has a defect that prevents its data from being read or recovered with ECC stored on that word line, the word line data can be recovered based on the parity data and data from other word lines in the group. Many other embodiments are disclosed herein.

Figure 1B:
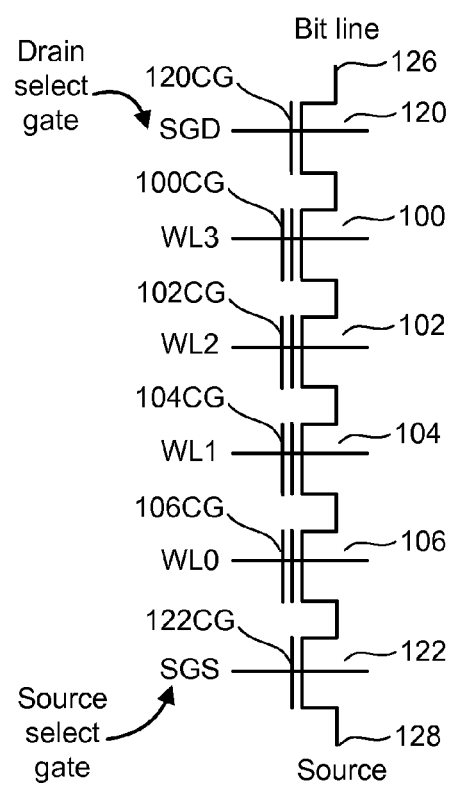
FIG. 1B is an equivalent circuit diagram of the NAND string of FIG. 1A.

One example of a memory system suitable for implementing embodiments uses a NAND flash memory structure, which includes arranging multiple transistors in series between two select gates. The transistors in series and the select gates are referred to as a NAND string. FIG. 1A is a top view showing one NAND string. FIG. 1B is an equivalent circuit thereof. The NAND string depicted in FIGS. 1A and 1B includes four transistors, 100, 102, 104 and 106, in series and sandwiched between a first select gate 120 and a second select gate 122. Select gate 120 gates the NAND string connection to bit line 126. Select gate 122 gates the NAND string connection to source line 128. Select gate 120 is controlled by applying the appropriate voltages to control gate 120CG. Select gate 122 is controlled by applying the appropriate voltages to control gate 122CG. Each of the transistors 100, 102, 104 and 106 has a control gate and a floating gate. Transistor 100 has control gate 100CG and floating gate 100FG. Transistor 102 includes control gate 102CG and floating gate 102FG. Transistor 104 includes control gate 104CG and floating gate 104FG. Transistor 106 includes a control gate 106CG and floating gate 106FG. Control gate 100CG is connected to (or is) word line WL3, control gate 102CG is connected to word line WL2, control gate 104CG is connected to word line WL1, and control gate 106CG is connected to word line WL0. In one embodiment, transistors 100, 102, 104 and 106 are each storage elements, also referred to as memory cells. In other embodiments, the storage elements may include multiple transistors or may be different than that depicted in FIGS. 1A and 1B. Select gate 120 is connected to select line SGD. Select gate 122 is connected to select line SGS. In one embodiment, select gates 120 and 122 are each implemented with a "select transistor." Thus, select gate 120 may be referred to as a "drain side select transistor," (or SGD transistor) and select gate 122 may be referred to as a "source side select transistor" (or SGS transistor).

Figure 2:
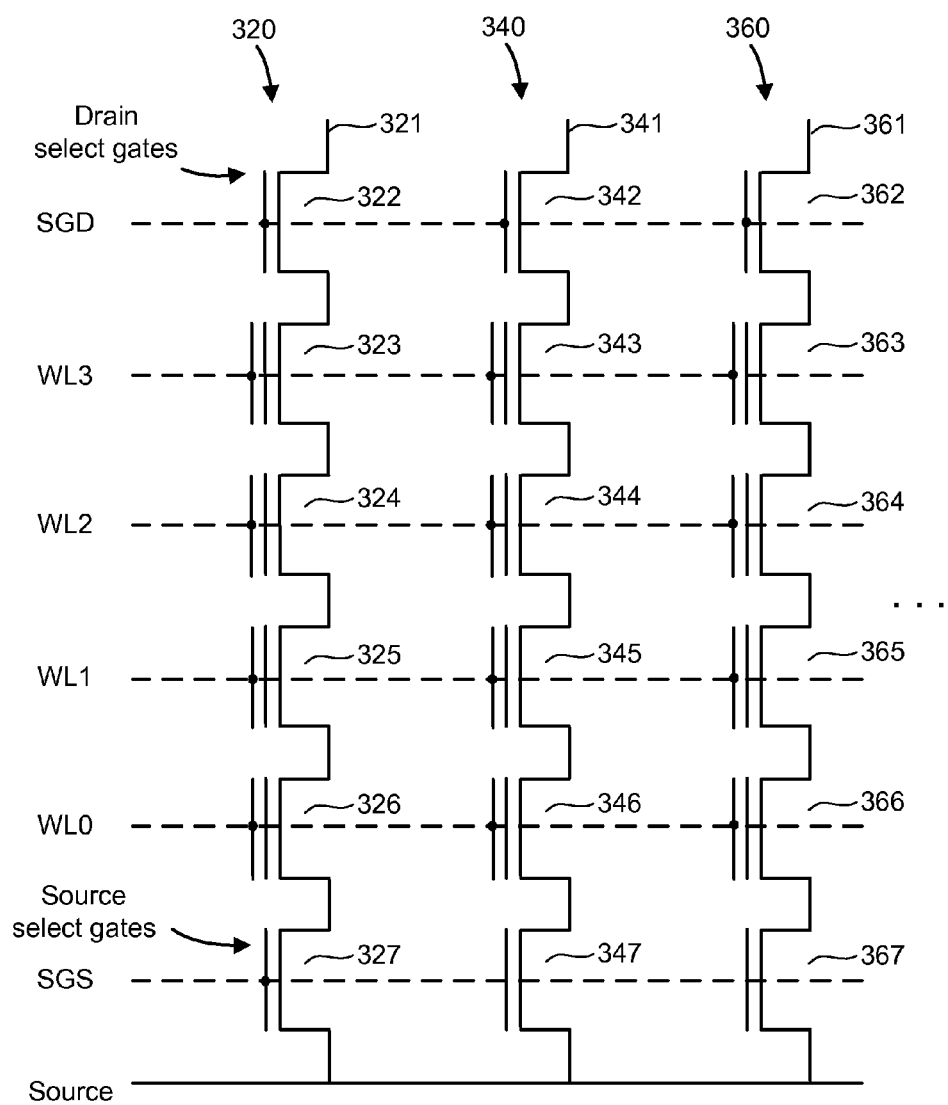
FIG. 2 is a circuit diagram depicting three NAND strings.

FIG. 2 is a circuit diagram depicting three NAND strings. A typical architecture for a flash memory system using a NAND structure will include several NAND strings. For example, three NAND strings 320, 340 and 360 are shown in a memory array having many more NAND strings. Each of the NAND strings includes two select gates and four storage elements. While four storage elements are illustrated for simplicity, modern NAND strings can have thirty-two, sixty-four, or more storage elements, for instance.

For example, NAND string 320 includes select gates 322 and 327, and storage elements 323-326, NAND string 340 includes select gates 342 and 347, and storage elements 343-346, NAND string 360 includes select gates 362 and 367, and storage elements 363-366. Each NAND string is connected to the source line by its select gates (e.g., select gates 327, 347 or 367). A selection line SGS is used to control the source side select gates. In one embodiment, the various NAND strings 320, 340 and 360 are connected to respective bit lines 321, 341 and 361, by select transistors. In one embodiment, the select transistors are in the select gates 322, 342, 362, etc. In one embodiment, the select transistors form the select gates 322, 342, 362. These select transistors are controlled by a drain select line SGD. In other embodiments, the select lines do not necessarily need to be in common among the NAND strings; that is, different select lines can be provided for different NAND strings. Word line WL3 is connected to the control gates for storage elements 323, 343 and 363. Word line WL2 is connected to the control gates for storage elements 324, 344 and 364. Word line WL1 is connected to the control gates for storage elements 325, 345 and 365. Word line WL0 is connected to the control gates for storage elements 326, 346 and 366. As can be seen, each bit line and the respective NAND string comprise the columns of the array or set of storage elements. The word lines (WL3, WL2, WL1 and WL0) comprise the rows of the array or set. Each word line connects the control gates of each storage element in the row. Or, the control gates may be provided by the word lines themselves. For example, word line WL2 provides the control gates for storage elements 324, 344 and 364. In practice, there can be thousands of storage elements on a word line.

Each storage element can store data. For example, when storing one bit of digital data, the range of possible threshold voltages ($V_{TH}$) of the storage element is divided into two ranges which are assigned logical data "1" and "0." In one example of a NAND type flash memory, the $V_{TH}$ is negative after the storage element is erased, and defined as logic "1." The $V_{TH}$ after a program operation is positive and defined as logic "0." When the $V_{TH}$ is negative and a read is attempted, the storage element will turn on to indicate logic "1" is being stored. When the $V_{TH}$ is positive and a read operation is attempted, the storage element will not turn on, which indicates that logic "0" is stored. A storage element can also store multiple levels of information, for example, multiple bits of digital data. In this case, the range of $V_{TH}$ value is divided into the number of levels of data. For example, if four levels of information are stored, there will be four $V_{TH}$ ranges assigned to the data values "11", "10", "01", and "00." In one example of a NAND type memory, the $V_{TH}$ after an erase operation is negative and defined as "11". Positive $V_{TH}$ values are used for the states of "10", "01", and "00." The specific relationship between the data programmed into the storage element and the threshold voltage ranges of the element depends upon the data encoding scheme adopted for the storage elements. For example, U.S. Pat. Nos. 6,222,762 and 7,237,074, both of which are incorporated herein by reference in their entirety, describe various data encoding schemes for multi-state flash storage elements.

Relevant examples of NAND type flash memories and their operation are provided in U.S. Pat. Nos. 5,386,422; 5,570,315; 5,774,397; 6,046,935; 6,456,528; and 6,522,580, each of which is incorporated herein by reference.

When programming a flash storage element, a program voltage is applied to the control gate of the storage element, and the bit line associated with the storage element is grounded. Electrons from the channel are injected into the floating gate. When electrons accumulate in the floating gate, the floating gate becomes negatively charged and the $V_{TH}$ of the storage element is raised. To apply the program voltage to the control gate of the storage element being programmed, that program voltage is applied on the appropriate word line. As discussed above, one storage element in each of the NAND strings share the same word line. For example, when programming storage element 324 of FIG. 2, the program voltage will also be applied to the control gates of storage elements 344 and 364.

Figure 3:
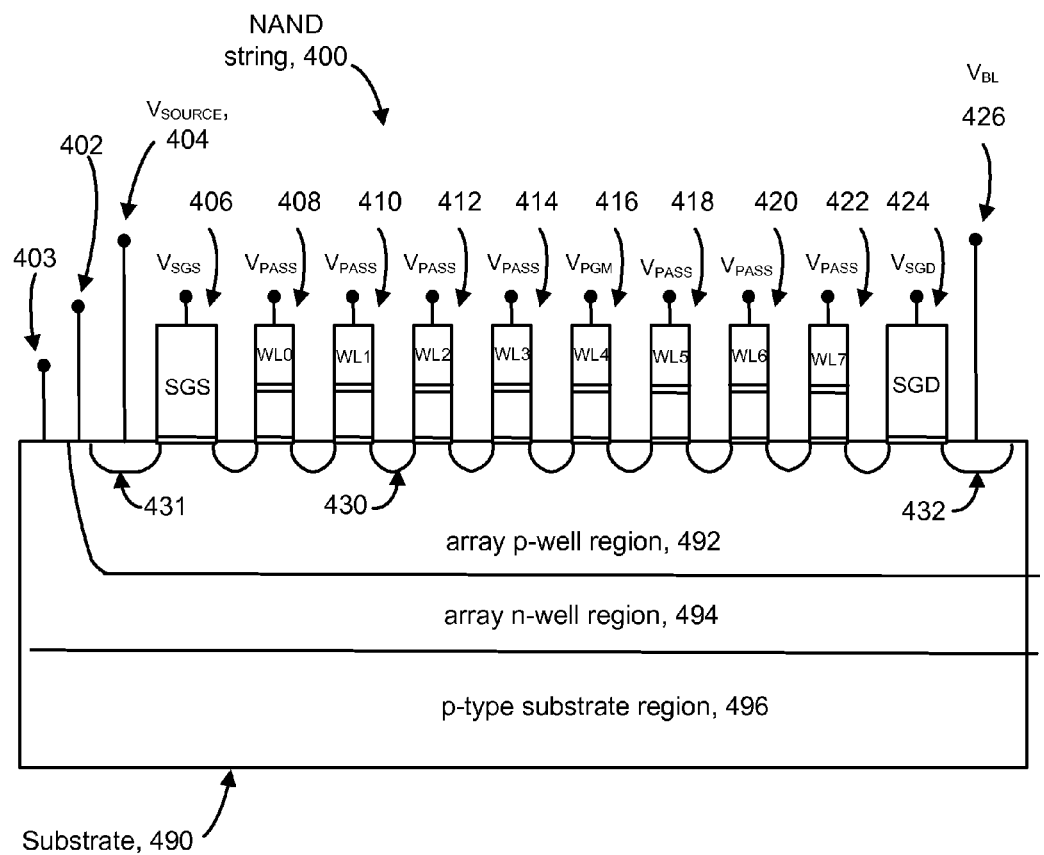
FIG. 3 depicts a cross-sectional view of a NAND string formed on a substrate.

FIG. 3 depicts a cross-sectional view of a NAND string formed on a substrate. The view is simplified and not to scale. The NAND string 400 includes a source-side select gate (or SGS transistor) 406, a drain-side select gate (or SGD transistor) 424, and eight storage elements 408, 410, 412, 414, 416, 418, 420 and 422, formed on a substrate 490. A number of source/drain regions, one example of which is source drain/region 430, are provided on either side of each storage element. In one embodiment, the substrate 490 employs a triple-well technology which includes an array p-well region 492 within an array n-well region 494, which in turn is within a p-type substrate region 496. The NAND string and its non-volatile storage elements can be formed, at least in part, on the array p-well region 492.

A voltage $V_{SOURCE}$ is provided to a source line contact 404. The source line contact has an electrical connection to the diffusion region 431 of SGS transistor 406. A bit line voltage $V_{BL}$ is supplied to bit line contact 426, which is in electrical contact with the diffusion region 432 of SGD transistor 424. Voltages, such as body bias voltages, can also be applied to the array p-well region 492 via a terminal 402 and/or to the array n-well region 494 via a terminal 403.

During a program operation, a control gate voltage $V_{PGM}$ is provided on a selected word line, in this example, WL3, which is associated with storage element 414. Further, recall that the control gate of a storage element may be provided as a portion of the word line. For example, WL0, WL1, WL2, WL3, WL4, WL5, WL6 and WL7 can extend via the control gates of storage elements 408, 410, 412, 414, 416, 418, 420 and 422, respectively. A pass voltage, $V_{PASS}$ is applied to the remaining word lines associated with NAND string 400, in one possible boosting scheme. $V_{SGS}$ and $V_{SGD}$ are applied to the select gates 406 and 424, respectively.

Figure 4:
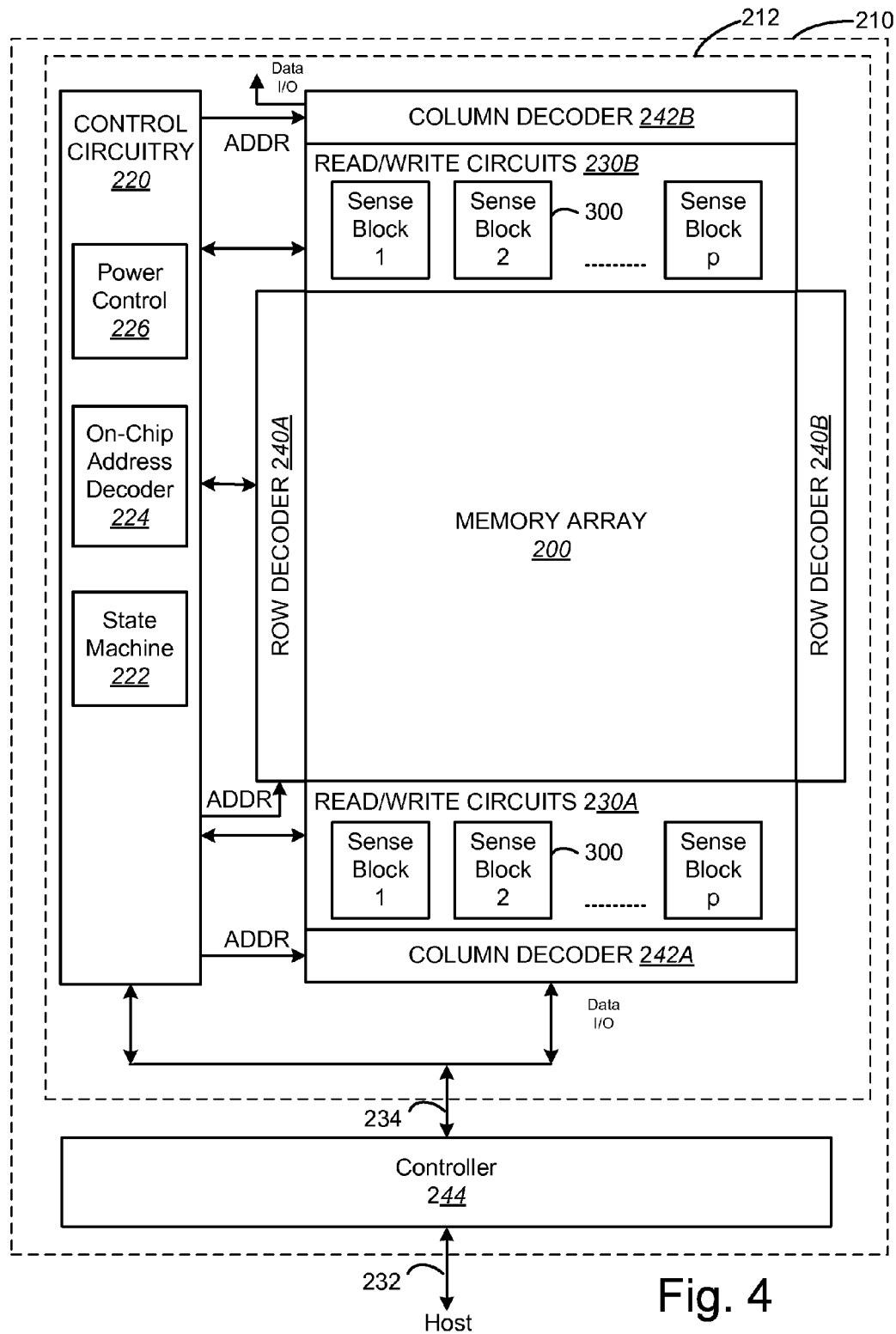
FIG. 4 illustrates a non-volatile storage device.

FIG. 4 illustrates a non-volatile storage device 210 that may include one or more memory die or chips 212. Memory die 212 includes an array (two-dimensional or three dimensional) of memory cells 200, control circuitry 220, and read/write circuits 230A and 230B. In one embodiment, access to the memory array 200 by the various peripheral circuits is implemented in a symmetric fashion, on opposite sides of the array, so that the densities of access lines and circuitry on each side are reduced by half. The read/write circuits 230A and 230B include multiple sense blocks 300 which allow a page of memory cells to be read or programmed in parallel. The memory array 200 is addressable by word lines via row decoders 240A and 240B and by bit lines via column decoders 242A and 242B. In a typical embodiment, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Control circuitry 220 cooperates with the read/write circuits 230A and 230B to perform memory operations on the memory array 200. The control circuitry 220 includes a state machine 222, an on-chip address decoder 224 and a power control module 226. The state machine 222 provides chip-level control of memory operations. The on-chip address decoder 224 provides an address interface to convert between the address that is used by the host or a memory controller to the hardware address used by the decoders 240A, 240B, 242A, and 242B. The power control module 226 controls the power and voltages supplied to the word lines and bit lines during memory operations. In one embodiment, power control module 226 includes one or more charge pumps that can create voltages larger than the supply voltage.

In one embodiment, one or any combination of control circuitry 220, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

Figure 5A:
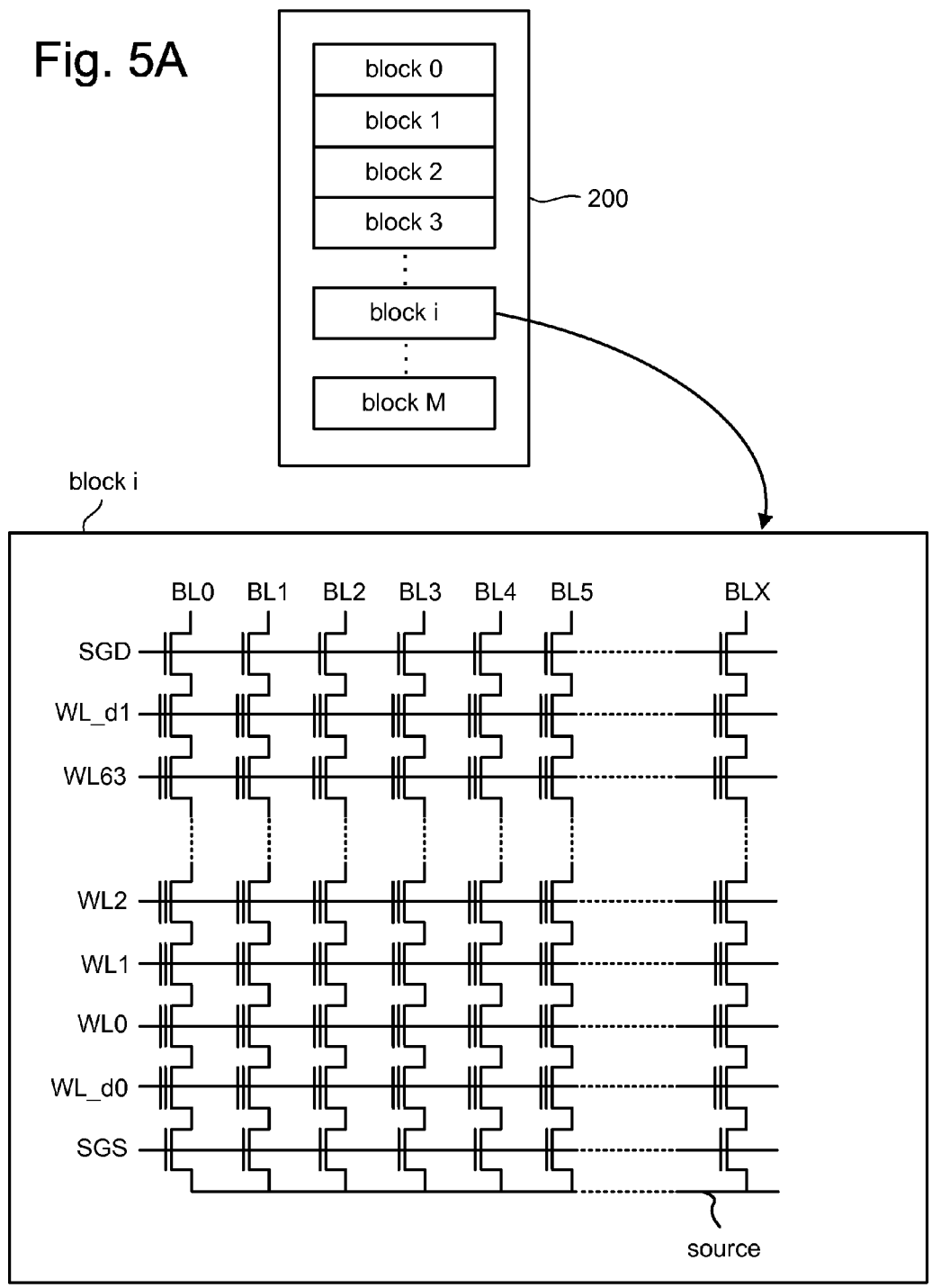
FIG. 5A depicts an exemplary structure of memory cell array.

FIG. 5A depicts an example structure of memory cell array 200. In one embodiment, the array of memory cells is divided into M blocks of memory cells. As is common for flash EEPROM systems, the block is the unit of erase. That is, each block contains the minimum number of memory cells that are erased together. Each block is typically divided into a number of pages. A page is a unit of programming. One or more pages of data are typically stored in one row of memory cells. A page can store one or more sectors. A sector includes user data and overhead data. Overhead data typically includes an Error Correction Code (ECC) that has been calculated from the user data of the sector. A portion of the controller (described below) calculates the ECC when data is being programmed into the array, and also checks it when data is being read from the array. In one embodiment, the controller 244 is able to correct a certain number of misreads, based on the ECC.

Alternatively, the ECCs and/or other overhead data are stored in different pages, or even different blocks, than the user data to which they pertain. A sector of user data is typically 512 bytes, corresponding to the size of a sector in magnetic disk drives. A large number of pages form a block, anywhere from 8 pages, for example, up to 32, 64, 128 or more pages. Different sized blocks and arrangements can also be used.

In another embodiment, the bit lines are divided into odd bit lines and even bit lines. In an odd/even bit line architecture, memory cells along a common word line and connected to the odd bit lines are programmed at one time, while memory cells along a common word line and connected to even bit lines are programmed at another time.

FIG. 5A shows more details of block i of memory array 200. Block i includes X+1 bit lines and X+1 NAND strings. Block i also includes 64 data word lines (WL0-WL63), 2 dummy word lines (WL_d0 and WL_d1), a drain side select line (SGD) and a source side select line (SGS). One terminal of each NAND string is connected to a corresponding bit line via a drain select gate (connected to select line SGD), and another terminal is connected to the source line via a source select gate (connected to select line SGS). Because there are sixty four data word lines and two dummy word lines, each NAND string includes sixty four data memory cells and two dummy memory cells. In other embodiments, the NAND strings can have more or fewer than 64 data memory cells and two dummy memory cells. Data memory cells can store user or system data. Dummy memory cells are typically not used to store user or system data. Some embodiments do not include dummy memory cells. In one embodiment, dummy memory cells are used to store parity bits that can be used to recover data from a defective word line in the block.

Figure 5B:
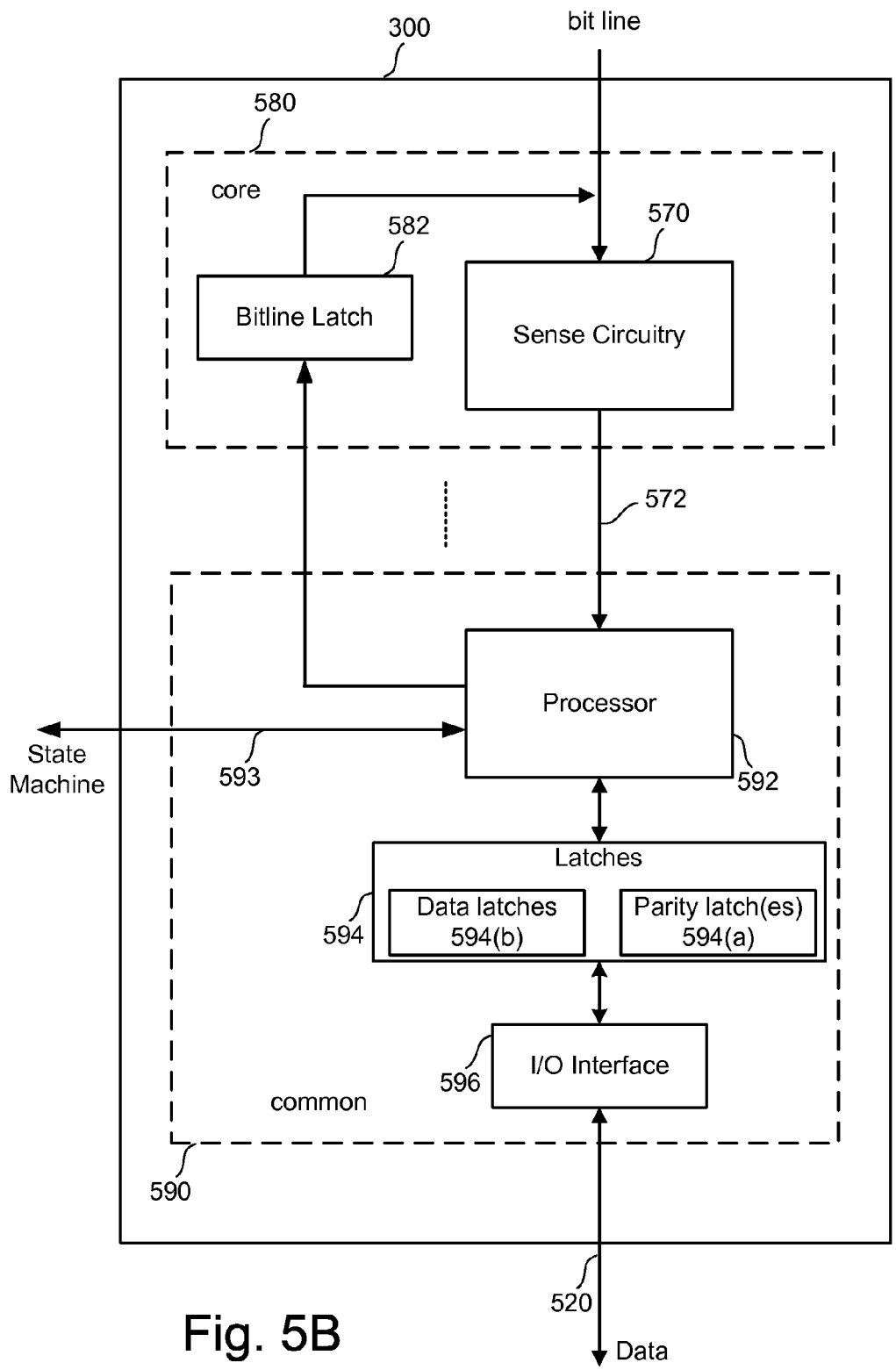
FIG. 5B is a block diagram of an individual sense block.

FIG. 5B is a block diagram of an individual sense block 300 partitioned into a core portion, referred to as a sense module 580, and a common portion 590. In one embodiment, there will be a separate sense module 580 for each bit line and one common portion 590 for a set of multiple sense modules 580. In one example, a sense block will include one common portion 590 and eight sense modules 580. Each of the sense modules in a group will communicate with the associated common portion via a data bus 572. For further details, refer to U.S. Patent Application Publication 2006/0140007, which is incorporated herein by reference in its entirety.

Sense module 580 comprises sense circuitry 570 that determines whether a conduction current in a connected bit line is above or below a predetermined threshold level. In some embodiments, sense module 580 includes a circuit commonly referred to as a sense amplifier. Sense module 580 also includes a bit line latch 582 that is used to set a voltage condition on the connected bit line. For example, a predetermined state latched in bit line latch 582 will result in the connected bit line being pulled to a state designating program inhibit (e.g., $V_{DD}$).

Common portion 590 comprises a processor 592, a set of data latches 594 and an I/O Interface 596 coupled between the set of latches 594 and data bus 520. Latches include data latches 594b and parity latches 594a. Processor 592 performs computations. For example, one of its functions is to determine the data stored in the sensed memory cell and store the determined data in the set of data latches. The set of data latches 594b is used to store data bits determined by processor 592 during a read operation. Data latches 594b may also be used to store data bits imported from the data bus 520 during a program operation. The imported data bits represent write data meant to be programmed into the memory. I/O interface 596 provides an interface between data latches 594b and the data bus 520.

During read or sensing, the operation of the system is under the control of state machine 222 that controls the supply of different control gate voltages to the addressed cell. As it steps through the various predefined control gate voltages corresponding to the various memory states supported by the memory, the sense module 580 may trip at one of these voltages and an output will be provided from sense module 580 to processor 592 via bus 572. At that point, processor 592 determines the resultant memory state by consideration of the tripping event(s) of the sense module and the information about the applied control gate voltage from the state machine via input lines 593. It then computes a binary encoding for the memory state and stores the resultant data bits into data latches 594. In another embodiment of the core portion, bit line latch 582 serves double duty, both as a latch for latching the output of the sense module 580 and also as a bit line latch as described above.

It is anticipated that some implementations will include multiple processors 592. In one embodiment, each processor 592 will include an output line (not depicted in FIG. 5B) such that each of the output lines is wired-OR'd together. In some embodiments, the output lines are inverted prior to being connected to the wired-OR line. This configuration enables a quick determination during the program verification process of when the programming process has completed because the state machine receiving the wired-OR line can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. In embodiments where each processor communicates with eight sense modules, the state machine may (in some embodiments) need to read the wired-OR line eight times, or logic is added to processor 592 to accumulate the results of the associated bit lines such that the state machine need only read the wired-OR line one time.

During program or verify, the data to be programmed is stored in the set of data latches 594b from the data bus 520. The program operation, under the control of the state machine, comprises a series of programming voltage pulses (with increasing magnitudes) applied to the control gates of the addressed memory cells. Each programming pulse is followed by a verify process to determine if the memory cell has been programmed to the desired state. Processor 592 monitors the verified memory state relative to the desired memory state. When the two are in agreement, processor 592 sets the bit line latch 582 so as to cause the bit line to be pulled to a state designating program inhibit. This inhibits the cell coupled to the bit line from further programming even if it is subjected to programming pulses on its control gate. In other embodiments the processor initially loads the bit line latch 582 and the sense circuitry sets it to an inhibit value during the verify process. In one embodiment, the magnitude of the inhibit value depends on the location of the selected word line.

Data latch stack 594b contains a stack of data latches corresponding to the sense module. In one embodiment, there are 3-5 (or another number) data latches per sense module 580. In one embodiment, the latches are each one bit. In some implementations (but not required), the data latches are implemented as a shift register so that the parallel data stored therein is converted to serial data for data bus 520, and vice versa. In one embodiment, all the data latches corresponding to the read/write block of M memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

In one embodiment, one or more of the parity latches 594a is used to store a present value of a parity bit for data being programmed into memory cells associated with the bit line. For example, as each memory cell along the bit line is programmed, a new value is calculated for the parity bit. In one embodiment, two bits are stored in each memory cell. Each bit may be associated with one page of data. In one embodiment, when two bits are stored per memory cell, there are two parity latches 594a for storing parity bits for each bit line. In one embodiment, even if two bits are stored per memory cell, only a single parity latch 594a is needed for storing parity bits for a bit line. Further details of generating the parity bits are discussed below.

In one embodiment, one or more of the parity latches 594a is used to store a present value of a parity bit when data is being recovered for a word line that cannot be otherwise read. For example, as each memory cell along the bit line is read, a new value is calculated for the parity bit. The new value is then stored into one of the parity latches 594a. Further details of using the parity bits to recover data are discussed below.

Additional information about the read operations and sense amplifiers can be found in (1) U.S. Pat. No. 7,196,931, "Non-Volatile Memory And Method With Reduced Source Line Bias Errors,"; (2) U.S. Pat. No. 7,023,736, "Non-Volatile Memory And Method with Improved Sensing,"; (3) U.S. Pat. No. 7,046,568, "Memory Sensing Circuit and Method for Low Voltage Operation; (4) U.S. Pat. No. 7,196,928, "Compensating for Coupling During Read Operations of Non-Volatile Memory," and (5) U.S. Pat. No. 7,327,619, "Reference Sense Amplifier For Non-Volatile Memory". All five of the immediately above-listed patent documents are incorporated herein by reference in their entirety.

At the end of a successful programming process (with verification), the threshold voltages of the memory cells should be within one or more distributions of threshold voltages for programmed memory cells or within a distribution of threshold voltages for erased memory cells, as appropriate. FIG. 6A illustrates example Vt distributions corresponding to data states for the memory cell array when each memory cell stores three bits of data. Other embodiment, however, may use more or fewer than three bits of data per memory cell. FIG. 6A shows eight Vt distributions corresponding to an Erase state and programmed states A-G. In one embodiment, the threshold voltages in the Erase state are negative and the threshold voltages in the programmed states A-G are positive.

However, the threshold voltages in one or more of programmed states A-G may be negative. Thus, in one embodiment, at least VrA is negative. Other voltages such as VvA, VrB, VvB, etc., may also be negative.

Between each of the data states are read reference voltages used for reading data from memory cells. For example, FIG. 6A shows read reference voltage VrA between the erase state and the A-state, and VrB between the A-state and B-state. By testing whether the threshold voltage of a given memory cell is above or below the respective read reference voltages, the system can determine what state the memory cell is in.

At or near the lower edge of each programmed state are verify reference voltages. For example, FIG. 6A shows VvA for the A-state and VvB for the B-state. When programming memory cells to a given state, the system will test whether those memory cells have a threshold voltage greater than or equal to the verify reference voltage.

FIG. 6B illustrates that Vt distributions can partially overlap since the error correction algorithm can handle a certain percentage of cells that are in error. Note that in some embodiments, at one point in time the threshold voltage distribution may resemble FIG. 6A and at another time the threshold voltage distributions may overlap, as in FIG. 6B. For example, just after programming, the threshold voltage distribution may resemble FIG. 6A. However, over time, the threshold voltages of memory cells may shift, such that there may be overlap.

Also note that contrary to the equal spacing/width of the depicted threshold voltage distributions, various distributions may have different widths/spacings in order to accommodate varying amounts of susceptibility to data retention loss.

Figure 7A:
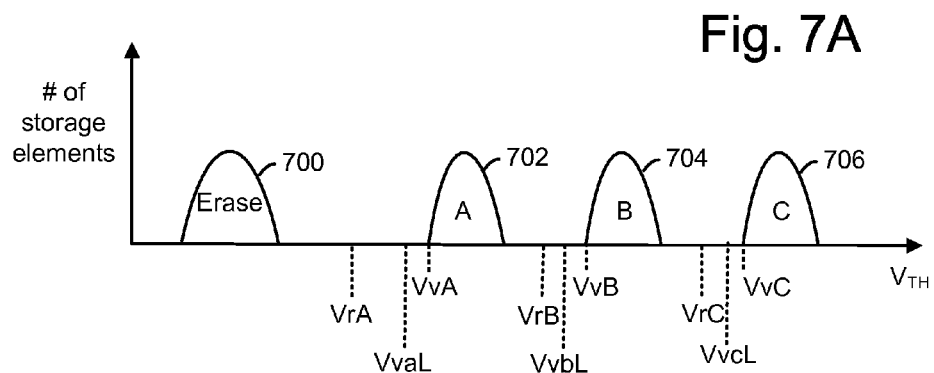
FIG. 7A depicts an example set of threshold voltage distributions for a four-state memory device in which each storage element stores two bits of data.

In some embodiments, a "verify low" and a "verify high" reference voltage is used. FIG. 7A depicts an example set of threshold voltage distributions for a four-state memory device in which each storage element stores two bits of data. A first threshold voltage distribution 700 is provided for erased (Erased-state) storage elements. Three threshold voltage distributions 702, 704 and 706 represent programmed states A, B and C, respectively. In one embodiment, the threshold voltages in the Erased-state are negative, and the threshold voltages in the A-, B- and C-states are positive.

Read reference voltages, VrA, VrB and VrC, are also provided for reading data from storage elements. By testing whether the threshold voltage of a given storage element is above or below VrA, VrB and VrC, the system can determine the state, e.g., the storage element is in.

Further, verify reference voltages, VvA, VvB, and VvC are provided. When programming storage elements to the A-state, B-state or C-state, the system will test whether those storage elements have a threshold voltage greater than or equal to VvA, VvB or VvC, respectively. In one embodiment, "verify low" reference voltages, VvaL, VvbL, and VvcL are provided. Similar "verify low" reference voltages could also be used in embodiments with a different number of states.

Figure 7B:
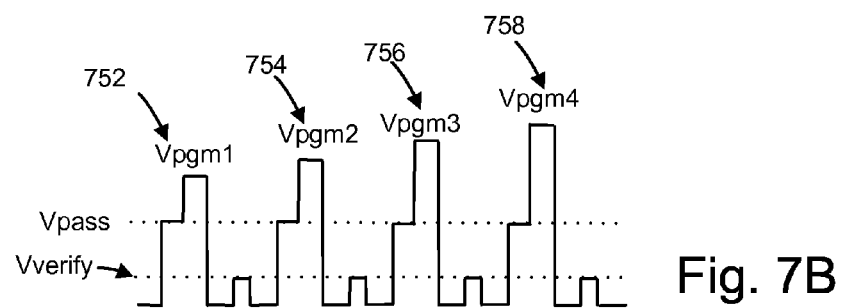
FIG. 7B shows a series of program pulses that may be used to program a distribution of FIG. 7A.

In full sequence programming, storage elements can be programmed from the Erased-state directly to any of the programmed states A, B or C. For example, a population of storage elements to be programmed may first be erased so that all storage elements in the population are in the Erased-state. A series of program pulses such as depicted in FIG. 7B is used to program storage elements directly into the A-, B- and C-states. While some storage elements are being programmed from the Erased-state to the A-state, other storage elements are being programmed from the Erased-state to the B-state and/or from the Erased-state to the C-state. Note that using a full sequence programming is not required.

In one embodiment, some of the memory cells are first programmed to an intermediate state. For example, memory cells targeted for the B- and C-states may be programmed to an intermediate state in a first programming pass. Then, in a second programming pass, memory cells targeted for the C-state are programmed from the intermediate state to the C-state and memory cells targeted for the A-state are programmed form the erased state to the A-state. Note that the first program pass could have multiple program loops. Likewise, the second program pass could have multiple program loops. Other techniques involving first programming to an intermediate state are possible. Further examples of programming sequences are discussed in U.S. Pat. No. 7,508,715 to Lee, titled "Coarse/Fine Program Verification in Non-Volatile Memory Using Different Reference Levels for Improved Sensing," which is hereby incorporated by reference for all purposes.

In one embodiment, "foggy-fine" programming is used in which memory cells are first programmed to a threshold level below their final intended threshold level in a "coarse" or "foggy" program pass. These states may be referred to as foggy states. Subsequently, the memory cells are programmed the remainder way to their intended threshold voltages in a fine programming pass. The final programmed state may be referred to as fine programmed state. Note that the foggy program pass could have multiple program loops. Note that the fine program pass could have multiple program loops. Further details of foggy-fine programming are discussed in U.S. Pat. No. 8,130,552 to Miwa et al., titled "Multi-Pass Programming for Memory with Reduced Data Storage Requirement," which is hereby incorporated by reference for all purposes.

In one embodiment, first the B- and C-states are programmed, then the A-state is programmed. While the B- and C-states are being programmed, bit lines associated with memory cells to be programmed to the A-state are inhibited. Then, after programming of the B- and C-states is complete, bit lines associated with memory cells to be programmed to the A-state are selected.

One example of a slow programming mode uses low (offset) and high (target) verify levels for one or more data states. For example, VvaL and VvA are offset and target verify levels, respectively, for the A-state, and VvbL and VvB are offset and target verify levels, respectively, for the B-state. During programming, when the threshold voltage of a storage element which is being programmed to the A-state as a target state (e.g., an A-state storage element) exceeds VvaL, its programming speed is slowed, such as by raising the bit line voltage to a level, e.g., 0.6-0.8 V, which is between a nominal program or non-inhibit level, e.g., 0 V and a full inhibit level, e.g., 2-3 V. The middle value may be referred to as a quick pass write (QPW) value. This provides greater accuracy by avoiding large step increases in threshold voltage. In some embodiments, values for one or more of the nominal program value, QPW value, and/or the inhibit value depend on the location of the word line that is selected for programming.

When the threshold voltage reaches VvA, the storage element is locked out from further programming. Similarly, when the threshold voltage of a B-state storage element exceeds VvbL, its programming speed is slowed, and when the threshold voltage reaches VvB, the storage element is locked out from further programming. In one approach, a slow programming mode is not used for the highest state since some overshoot is typically acceptable. Instead, the slow programming mode can be used for the programmed states, above the erased state, and below the highest state.

Moreover, in the example programming techniques discussed, the threshold voltage of a storage element is raised as it is programmed to a target data state. However, programming techniques can be used in which the threshold voltage of a storage element is lowered as it is programmed to a target data state. Programming techniques which measure storage element current can be used as well. The concepts herein can be adapted to different programming techniques.

FIG. 7B depicts a series of program and verify pulses which are applied to a selected word line during a programming operation. A programming operation may include multiple programming iterations, where each iteration applies one or more program pulses (voltages) followed by one or more verify voltages, to a selected word line. In one possible approach, the program voltages are stepped up in successive iterations. Moreover, the program voltages may include a first portion which has a pass voltage (Vpass) level, e.g., 6-8 V, followed by a second portion at a program level, e.g., 12-25 V. For example, first, second, third and fourth program pulses 752, 754, 756 and 758 have program voltages of Vpgm1, Vpgm2, Vpgm3 and Vpgm4, respectively, and so forth. A set of one or more verify voltages may be provided after each program pulse. In some embodiments, there may be two or more verify pulses between the program pulses. In some cases, one or more initial program pulses are not followed by verify pulses because it is not expected that any storage elements have reached the lowest program state (e.g., A-state). Subsequently, program iterations may use verify pulses for the A-state, followed by program iterations which use verify pulses for the A- and B-states, followed by program iterations which use verify pulses for the B- and C-states, for instance.

Figure 8:
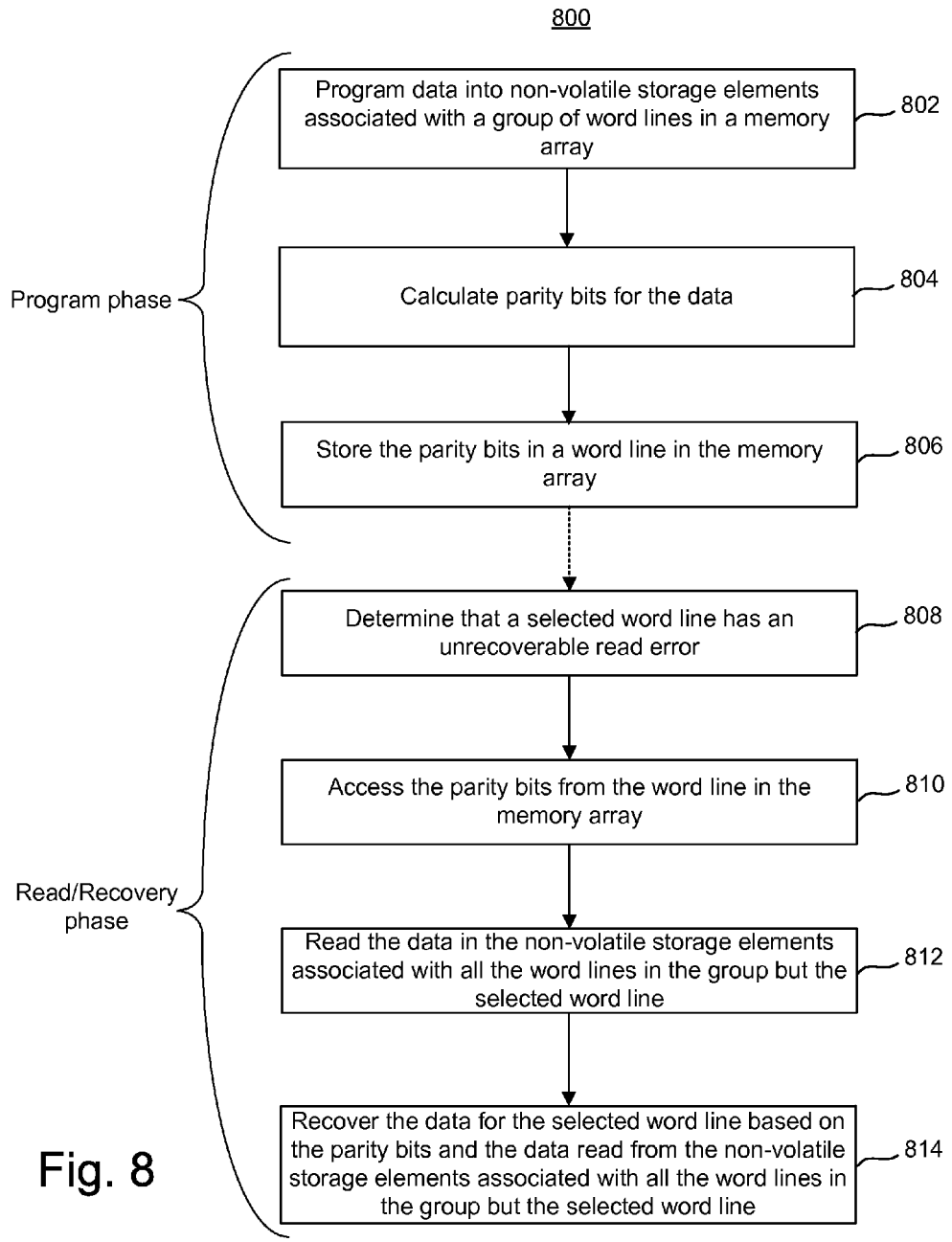
FIG. 8 is a flowchart describing one embodiment of a process of operating non-volatile storage.

FIG. 8 is a flowchart describing one embodiment of a process 800 of operating non-volatile storage. Process 800 may be used to recover data in a word line that cannot otherwise be read. For example, the word line cannot be read by using ECC that was generated only based on data stored on that word line. The process 800 could be used to recover a page of data stored on a word line, or any other unit of data. In some embodiments, two, three or more pages of data are stored on each word line. Process 800 is compatible with storing and recovering any number of pages of data per word line.

Step 802 includes programming data into a non-volatile storage elements associated with a group of word lines in a memory array. Note that when programming word lines in a memory array, sometimes all word lines are programmed as a part of the same data storage operation. The group of word lines being referred to in step 802 could be all of the word lines being programmed in the block. However, this is not always the case, as sometimes fewer than all of the word lines in a block are programmed at roughly the same time. For example, the amount of data presently being stored may not fill the block.

In one embodiment, the word lines in a block are divided into a group of even word lines and a group of odd word lines. Thus, the group of word lines in step 802 could be all even word lines in a block be programmed. Note that process 800 could also be performed with the group of word lines being all odd word lines in the block being programmed. The group of word lines could be defined in another manner. In one embodiment, the controller 244 determines what size the group of word lines should be. The group could be larger than one block. The group could be some fractional block size that is greater than one block. For example, if there are 64 word lines in a block, the group might be 100 word lines.

Step 804 includes calculating parity bits for the data being programmed. In one embodiment, each parity bit is calculated from data for a set of the non-volatile storage elements that includes one non-volatile storage element associated with each word line in the group. For example, the set of non-volatile storage elements may be associated with a bit line. This set might be a NAND string, but that is not required. Thus, one parity bit may be formed for each bit line, as one example. If all of the memory cells are in the same block (which is not requirement), then one parity bit may be formed for each NAND string.

Figure 9A:
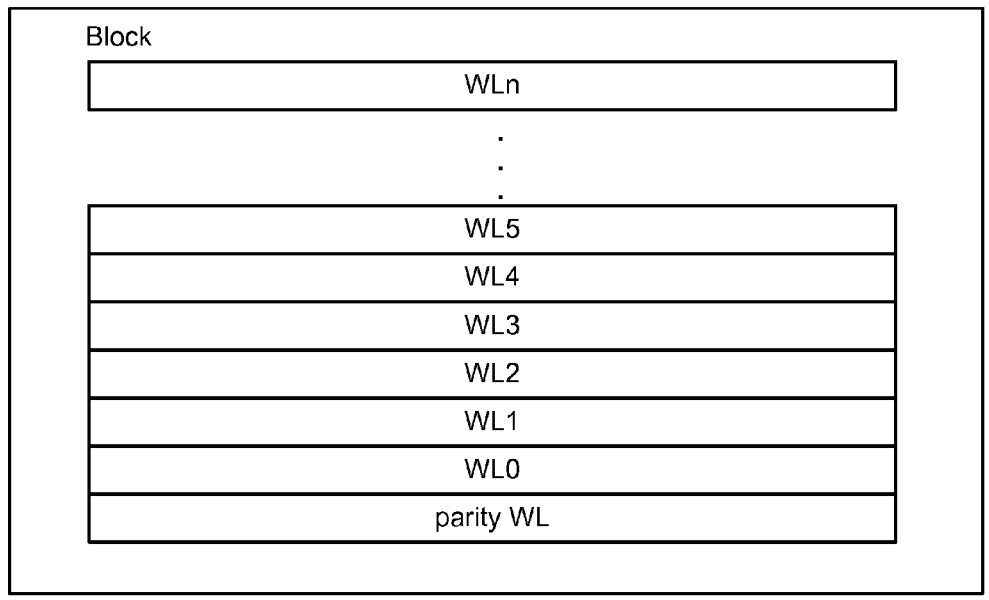
FIG. 9A shows one embodiment in which a parity word line is in the same block as the group of word lines being programmed.

Step 806 includes storing the parity bits in a word line in the memory array. The word line might be in the same block as memory cells being programmed, or another block. This word line may be referred to as a parity word line, as it is used to store parity bits. This word line may also be referred to as an additional word line, as it is in addition to the group being programmed. FIG. 9A shows one embodiment in which the parity word line is in the same block as the group of word lines being programmed. In this case, word lines WL0-WLn are being programmed. In one embodiment, all of the word lines WL0-WLn are in the group mentioned in step 802. The parity word line stores parity bits calculated based on data stored in all of the word lines WL0-WLn, in one embodiment.

Figure 9B:
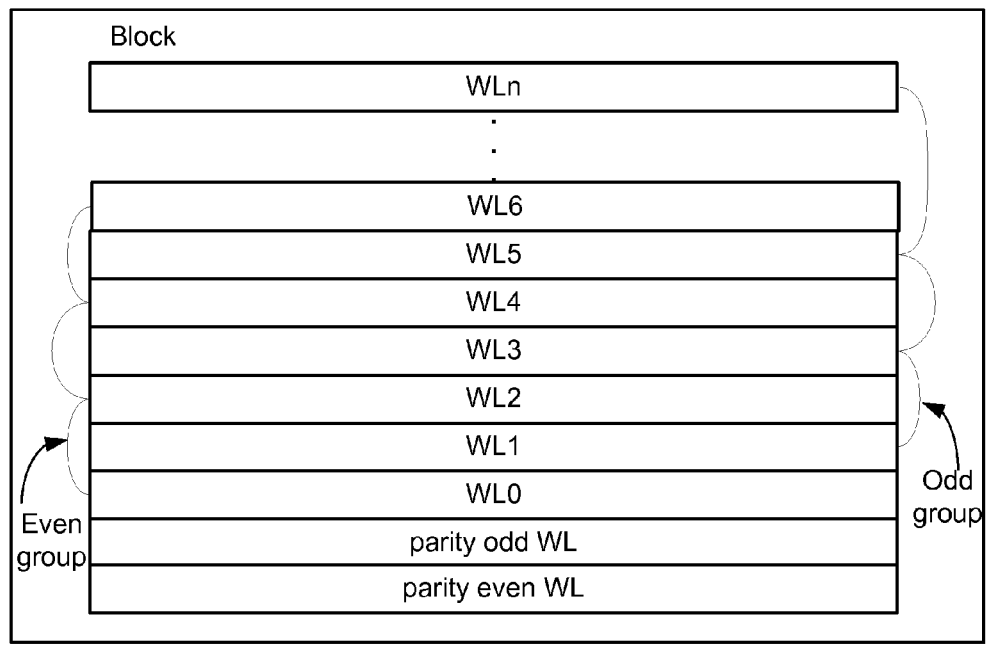
FIG. 9B shows one embodiment in which two parity word lines are in the same block as the group of word lines being programmed.

FIG. 9B shows one embodiment in which two parity word lines (parity odd WL and parity even WL) are in the same block as the group of word lines being programmed. In this case, word lines WL0-WLn are being programmed. In one embodiment, all of the even word lines WL0, WL2, WL4, etc. are in the group mentioned in step 802. The even parity word line (parity even WL) stores parity bits calculated based on data stored in all of the even word lines WL0, WL2, WL4, etc., in one embodiment. In one embodiment, all of the odd word lines WL1, WL3, WL5, etc. are in the group mentioned in step 802. The odd parity word line (parity odd WL) stores parity bits calculated based on data stored in all of the odd word lines WL1, WL3, WL5, etc., in one embodiment.

In the example of FIGS. 9A and 9B, the parity word line maybe a word line that is dedicated to storing parity bits. This could be a data word line or a dummy word line. However, this is not required. In one embodiment, the parity word line could be any word line in the block. Moreover, the parity word line is not necessarily dedicated to storing parity bits. For example, at one point a word line might store user data, and at another time it might store parity bits.

FIG. 9C shows one embodiment in which the group of word line from step 802 covers more than one block. In this case, word lines WL0-WLn from block n are being programmed. Also, word lines WL0 to WLn−4 from block n+1 are being programmed. In one embodiment, all these word lines being programmed are in the group mentioned in step 802. In this example, the controller 244 may have specified that these word lines should be in the group in step 802. In this example, WL n−3 in block n+1 is used as the parity word lines (as pointed to be "Parity WL"). A reason for this selection is that it follows the other word lines being programmed in a programming sequence in which word lines in a block are programmed from low to high. Note that the parity word line could be located elsewhere.

There is a dashed arrow between steps 806 and 808 in FIG. 8, indicating that some time may pass between these steps. Typically steps 802-806 are performed during a programming operation. Steps 808-814 may be performed during a read operation after completion of the programming operation.

In step 808, it is determined that a selected word line has a read error. In one embodiment, the read error is one that cannot be recovered using ECC that is based only on data stored on that word line. In response to determining that the selected word line in the group of word lines has a read error, steps 810-814 may be performed.

In step 810, the parity bits are accessed from the parity word line in the memory array. Above, an example was provided in which the word lines were divided into even and odd, as depicted in FIG. 9B. This example will be used to illustrate.

If the selected word line is one of the even word lines, then the parity bits from parity even WL are accessed. However, if the selected word line is one of the odd word lines, then the parity bits from parity odd WL are accessed. Using the example from FIG. 9A, the parity bits from parity WL are accessed regardless which word line in the block cannot be read.

In step 812, data is read from the non-volatile storage elements associated with all of the word lines in the group but the selected word line. The example from FIG. 9A will be used to illustrate, with the assumption that the selected word line that cannot be read is WL3. In step 812, every word line but WL3 is read. Further details of reading these word lines and processing the data from the word lines are discussed below.

In step 814, data that was stored in non-volatile storage elements associated with the selected word line is recovered based on the parity bits and the data read from the non-volatile storage elements associated with all of the word lines in the group but the selected word line. For example, data stored in WL3 is recovered based on data read out from all other word lines in the block and the parity bits from parity WL. Further details of this recovery process are discussed below. Note that no data from WL3 is needed to complete the recovery process. Therefore, even in situations in which a word line has such as severe defect that none or almost none of the memory cells can be accurately read, the data from the word line may still be recovered.

Figure 10:
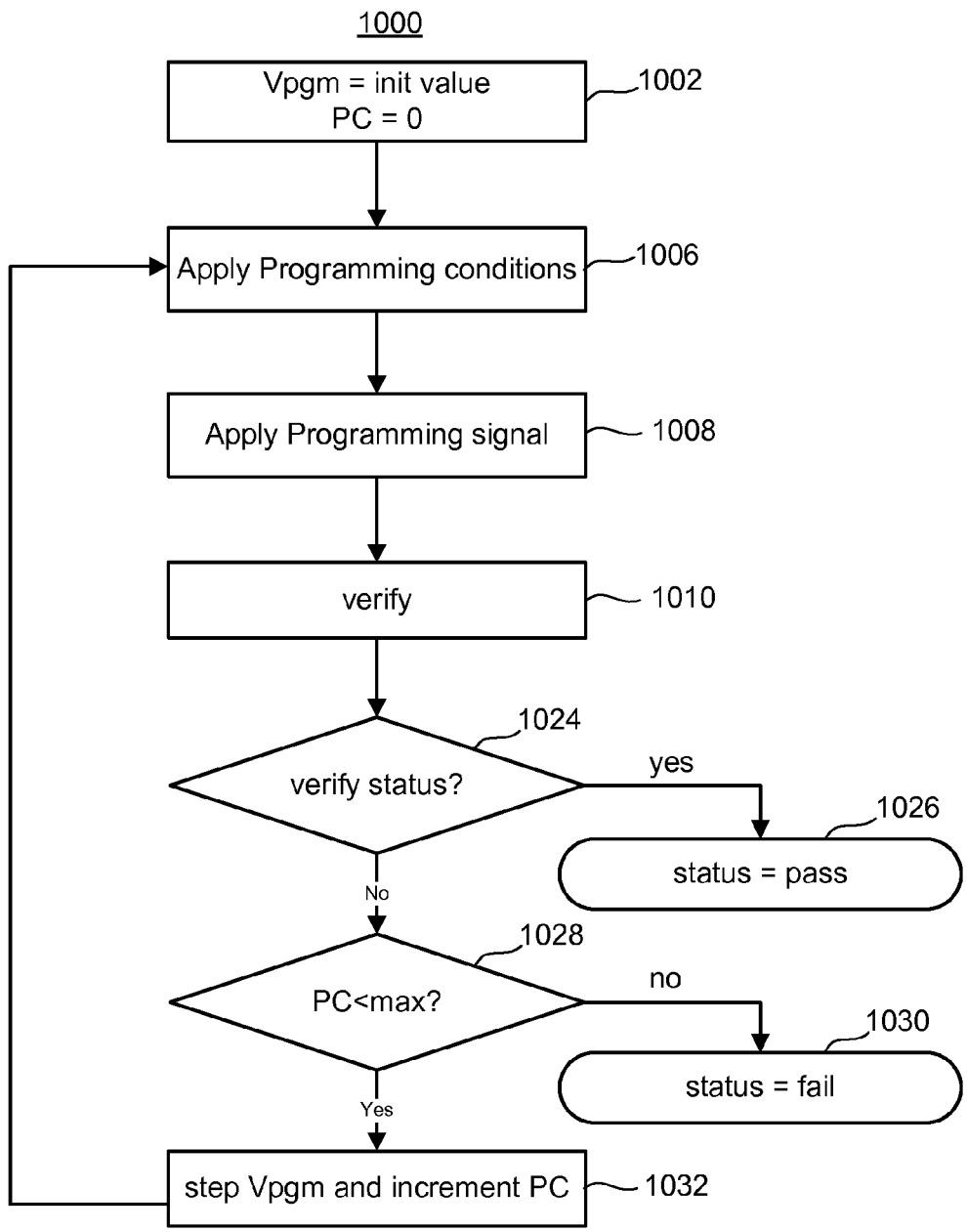
FIG. 10 is a flowchart illustrating one embodiment of a process of programming non-volatile storage.

FIG. 10 is a flowchart illustrating one embodiment of a process 1000 of programming non-volatile storage. In one embodiment, the process 1000 is used to program memory cells on a selected word line. In one embodiment, the process is used to program every memory cell on the selected word line. In one embodiment, the process is used to program every other memory cell (e.g., odd/even programming) on the selected word line. The process may be used once to program each of the word lines that is programmed in step 802 of FIG. 8. In one embodiment, when data for a page is programmed on a word line, the system will also create extra bits used for Error Correction Codes (ECCs) and write those ECC bits along with the page of data.

In step 1002, a program voltage (Vpgm) is set to an initial value. Also, in step 1002, a program counter (PC) is initialized to zero.

In step 1006, program conditions are applied. During step 1006, suitable voltages are applied to bit lines. The bit line voltage may depend on whether there is a memory cell associated with the bit line that is undergoing programming, or whether programming is being inhibited for all memory cells associated with the bit line.

In step 1008 a programming signal (e.g., Vpgm) is applied to a selected word line. In step 1010, a verification process is performed. In one embodiment, the verification is a concurrent coarse/fine verify. Referring to FIG. 7A, as one example, some memory cells that are being programmed to the A-state are verified using the VvaL level, and others that are being programmed to the A-state are verified using the Vva level. During the initial programming steps in which the memory cell's threshold is well below the final level (Vva), course programming may be applied. However, after the memory cell's threshold voltage reaches VvaL, fine programming may be used. Thus, some memory cells are verified for coarse programming, whereas other memory cells are verified for fine programming. Note that when a particular memory cell has been verified as being programmed to its intended state, it may be locked out from further programming. Note that using coarse/fine programming is not required. In one embodiment, the intermediate verify levels (e.g., VvaL, VvbL, etc.) are not used.

Also note that during step 1010 the verification may be for more than one state. For example, memory cells being programmed to the A-, B-, and C-state could all undergo verify during step 1010. However, verification could be of less than all of the states (such as if the B- and C-states are programmed first).

In step 1024, it is determined whether all states have been successfully programmed. In one embodiment, a given state is successfully programmed if all but some number of the memory cells have reached the final target threshold voltage for that memory cell. The number may be zero or more. Thus, note that not every memory cell needs to reach its target threshold voltage.

If verification of all states passes, the programming process is completed successfully (status=pass) in step 1026. If all states are not verified as being programmed, then it is determined whether the program counter (PC) is less than a maximum value such as 20. If the program counter (PC) is not less than max (step 1028), then the program process has failed (step 1030). If the program counter (PC) is less than a maximum value (e.g., 20), then the program counter (PC) is incremented by one and the program voltage may be stepped up to the next pulse in step 1032. Subsequent to step 1032, the process loops back to step 1006.

Figure 11:
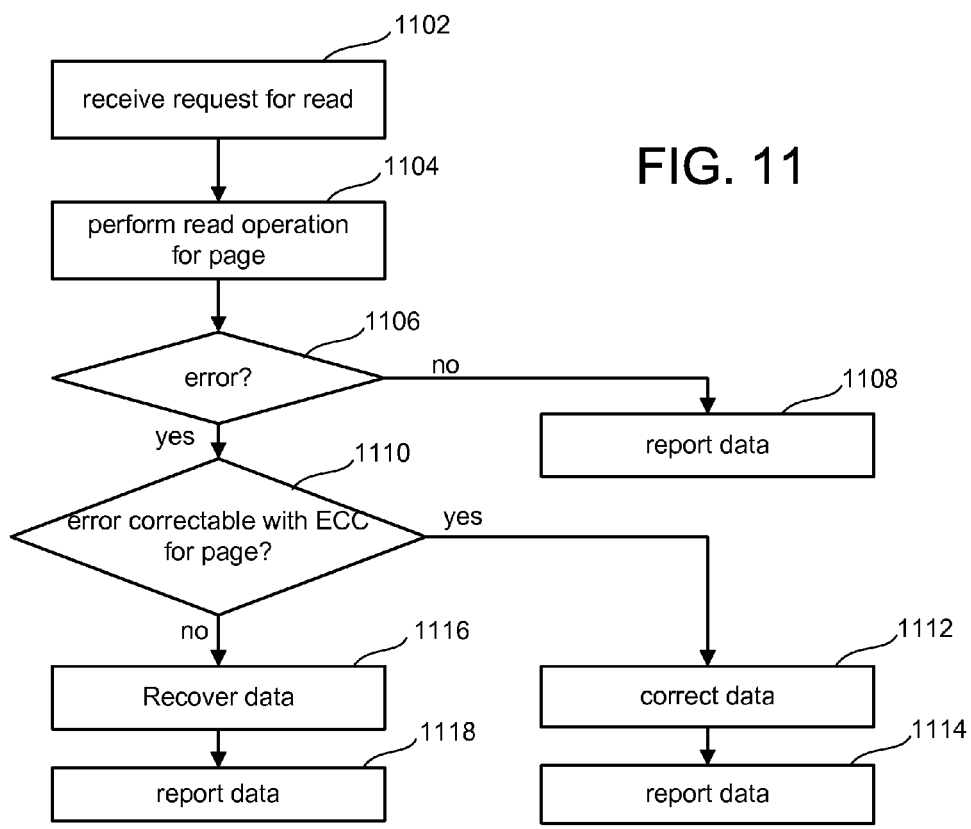
FIG. 11 is a flow chart describing one embodiment for reading data from non-volatile memory cells.

FIG. 11 is a flow chart describing one embodiment for reading data from non-volatile memory cells. FIG. 11 describes one embodiment of a read process at the system level. At step 1102, a request to read data is received. At step 1104, a read operation is performed for a particular page in response to the request to read data. In one embodiment, when data for a page is programmed, the system will also create extra bits used for Error Correction Codes (ECCs) and write those ECC bits along with the page of data. When reading data from a page, the ECC bits will be used to determine whether there are any errors in the data at step 1104. The ECC process can be performed by the controller, the state machine or elsewhere in the system. If there are no errors in the data, the data is reported to the user at step 1108. If an error is found at step 1106, it is determined whether the error is correctable at step 1110. Various ECC methods have the ability to correct a predetermined number of errors in a set of data. In one embodiment, the Error Correction Codes that were stored on the word line being read are used to attempt to correct the read error. If the ECC process can correct the data, then the ECC process is used to correct that data at step 1112 and the data, as corrected, is reported to the user at step 1114.

If the data is not correctable by the ECC process, a data recovery process may be performed at step 1116. In one embodiment, steps 810-814 of process 800 are used to recover the data. In step 1118, the recovered data is reported.

Figure 12:
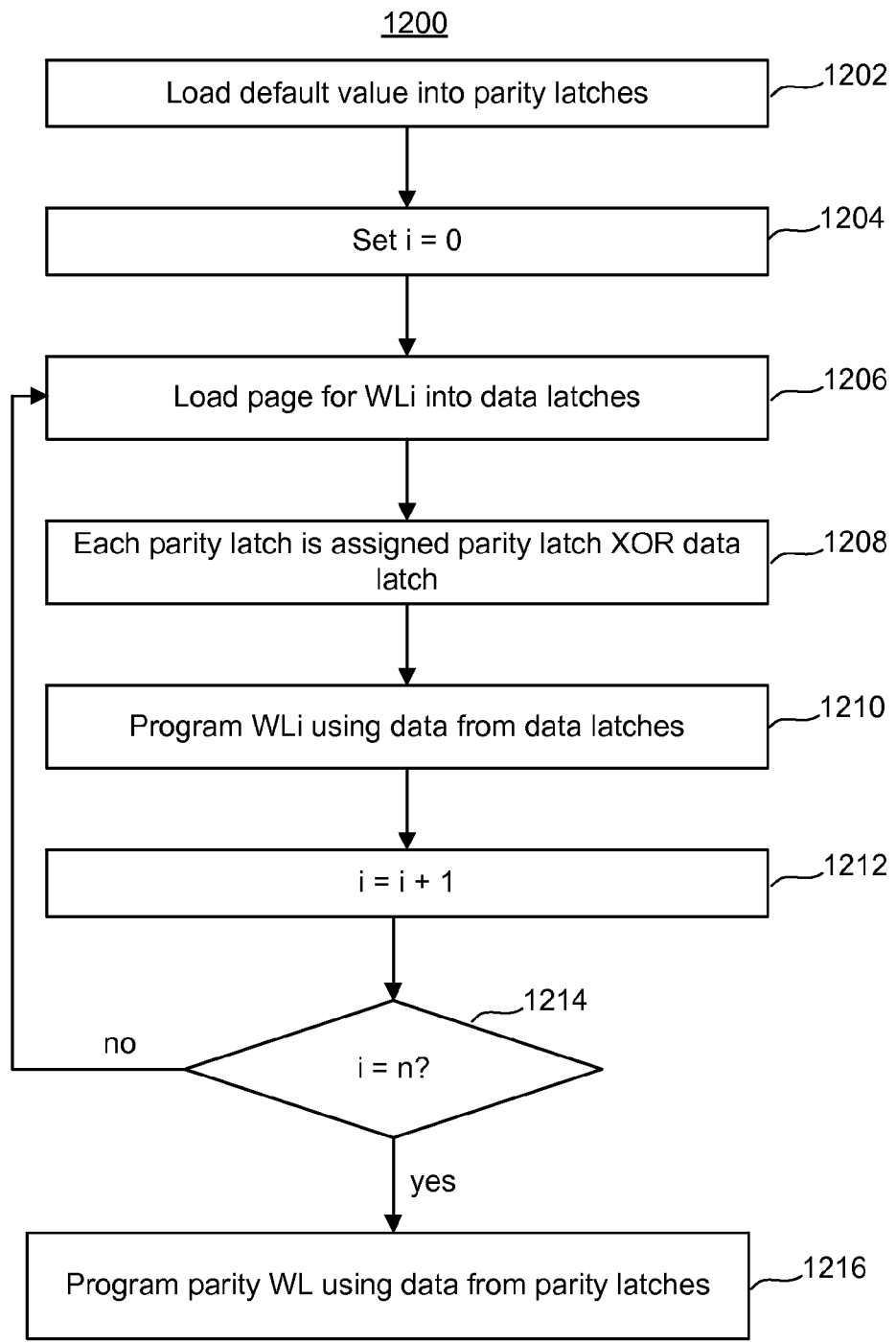
FIG. 12 is a flowchart of one embodiment of a process of calculating and storing parity bits based on data being programmed.

FIG. 12 is a flowchart of one embodiment of a process 1200 of calculating and storing parity bits based on data being programmed. The process may be used to generate and store parity bits for one page that is being programmed. The process is one embodiment of steps 802-806 of FIG. 8. In step 1202, default values are loaded into parity latches 594a. The default values could be all zeros or all ones, for example. In one embodiment, one parity latch 594a is used for each bit line having a memory cell being programmed with data. In one embodiment, the number of parity latches is equal to the number of memory cells being programmed on a word line. Note that this may include one parity latch for each bit in the page.

In step 1204, a word line counter is initialized (i=0). The word line counter is used to count the number of word lines in the group that is associated with the parity bits being generated. Note that, in general, this is not necessarily every word line being programmed in a block. However, in one embodiment, all word lines in the block are programmed in one programming operation and they are all in the group for which parity is being generated.

In step 1206, the page for WLi is loaded into the data latches 594b. For purposes of illustration, an example in which a single page is programmed onto a word line will be discussed. Examples of programming multiple pages per word line will be discussed below.

In step 1208, each parity latch 594a is assigned the present value of the parity latch 594a XORed with the data from the data latch 594b. In this example, there is one page per word line. In other words, there is one bit per memory cell. Thus, there is one parity latch 594a per bit line, in this example.

In step 1210, word line WLi is programmed using the data from the data latches 594b. In step 1212, the word line counter is incremented. Note that in this example by incrementing the counter by one, it is implied that the parity is based on data being stored in both odd and even word lines. An example in which the parity is based on only odd or only even word lines is discussed below.

In step 1214, it is determined whether all of the word lines in the group have been programmed. For example, this might be whether all word lines in the block have been programmed. However, the group could be larger or smaller than a block. If programming is not yet complete, the process returns to step 1206 to load the next data page. That is, the page for the next word line to be programmed is loaded. Note that when step 1208 is performed, this is based on the present value in the parity latches 594a and the present data being programmed.

When step 1214 determines that all word lines have been programmed, then the parity WL is programmed using the data from the parity latches, in step 1216. Note that this programming may store a parity bit corresponding to each of the bits in the data pages. The parity WL may also store an ECC code that is based on just the parity bits stored in the parity WL. This ECC code may be used when reading back the parity WL to correct for possible misreads. Note that it is not required that the word lines be programmed sequentially. Therefore, it will be understood that programming word lines in a sequence from WL0 to WLn is for purpose of illustration.

Figure 13:
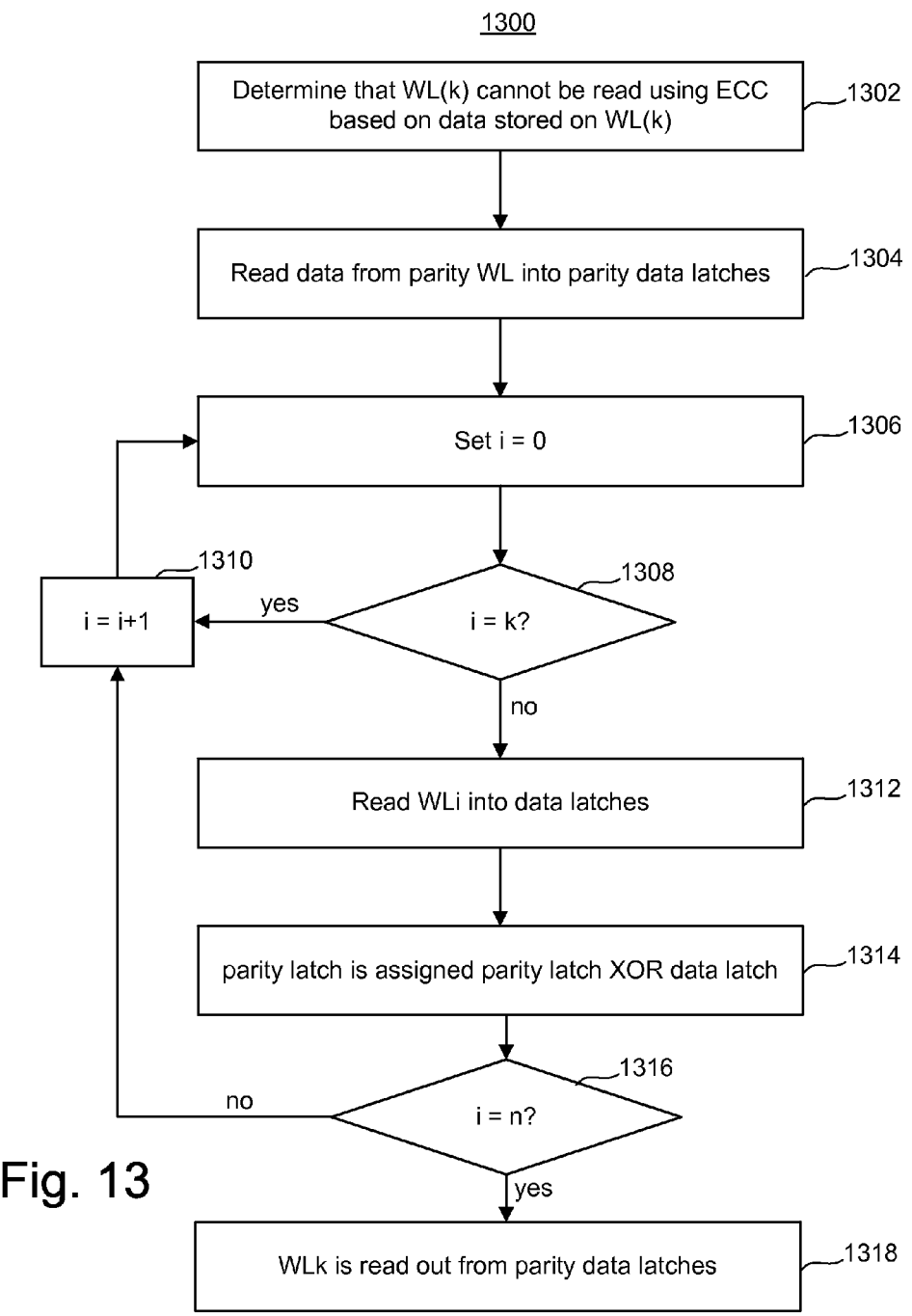
FIG. 13 is a flowchart of one embodiment of a process of recovering data that was stored in a word line.

FIG. 13 is a flowchart of one embodiment of a process 1300 of recovering data that was stored in a word line. Process 1300 is one embodiment of steps 808-814 of FIG. 8. Process 1300 describes using parity bits from one parity word line to recover data that stored in one word line in a group of word lines for which the parity bits were calculated. Process 1300 may be used when process 1200 was used to store the parity bits. Process 1300 may be used to recover a page that was programmed. Note that the unit of data being recovered is not required to be a page of data.

In step 1302, a determination is made that a selected word line cannot be read using ECC based on data stored on that word line. As one example, step 1110 determined that a read error was uncorrectable.

In step 1304, data is read from the parity word line that is associated with the word line for which the data cannot be read. In one embodiment, Error Correction Codes are stored on the parity word line. The controller may use these ECC to correct any possible misreads. Then, the corrected data may be stored in the parity latches 594a.

In step 1306, a word line counter is initialized (i=0). The word line counter is used to count the number of word lines in the group that are associated with the parity bit word line. As discussed above, the parity bits were calculated based on data stored in some specific group of word lines.

In step 1308, a determination is made whether the word line counter is equal to the number of the word line that cannot be read. If so, then further processing is skipped. The process goes to step 1310, where the word line counter is incremented (i=i+1). Note that an increment other than one might be used in some cases. If the word line count does not equal the word line that cannot be read, then processing continues in step 1312.

In step 1312, data for WLi is loaded into the data latches 594*b*. Step 1312 may include using Error Correction Codes that are stored on WLi to correct misreads.

In step 1314, each parity latch is assigned the present value of the parity latch 594*a* XORed with the data from the data latch 594*b*. In one embodiment, there is one page per word line. In other words, there is one bit per memory cell. Thus, there is one parity latch 594*a* per bit line, in one embodiment.

In step 1316, the word line counter is compared to a value of the group size ("n") to determine whether all word lines in the group have been processed. Is not, then the word line counter is incremented in step 1310. The process then continues with step 1306.

When step 1316 determines that all word lines have been processed, then the data is recovered by reading out that data from the parity latches 594*a*. In one embodiment, this recovers one page of data that was originally stored in the word line that cannot be otherwise read at this time. Note that it is not required that the word lines be processed sequentially. Therefore, it will be understood that processing word lines in a sequence from WL0 to WLn is for purpose of illustration.

Figure 14:
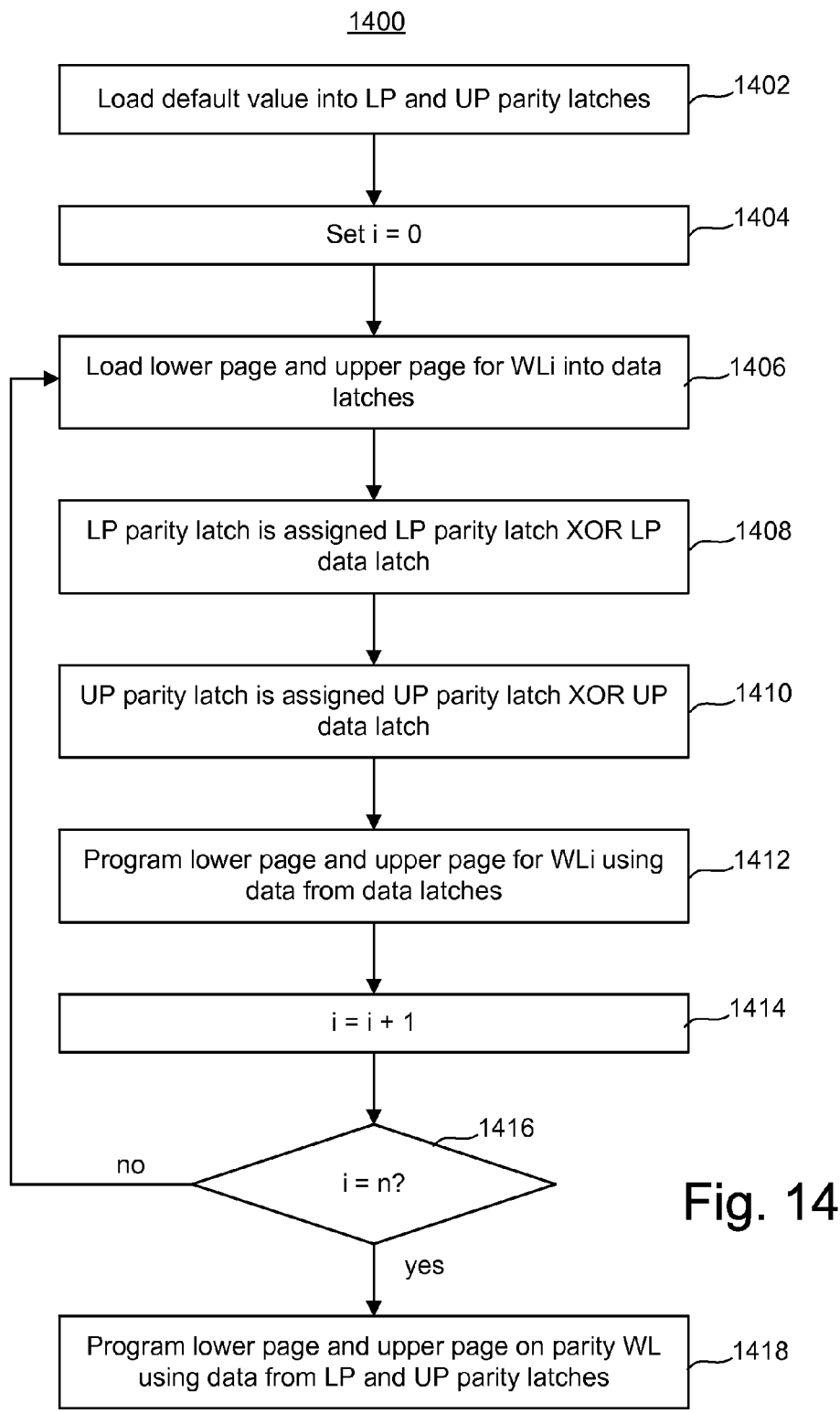
FIG. 14 is a flowchart of one embodiment of a process of calculating and storing parity bits, based on two pages being programmed per word line.

In some embodiments, each memory cell stores more than one bit. In such a case, more than one page may be stored per word line. When two pages are stored per word line, they may be referred to as a lower page and an upper page. In this case, each memory cell may store one bit from the lower page and one bit from the upper page. FIG. 14 is a flowchart of one embodiment of a process 1400 of calculating and storing parity bits, based on two pages being programmed per word line. The process may store the parity bits on a single parity word line. In process 1400, two parity latches 594*a* are used per bit line. These two latches will be referred to as a lower page (LP) parity latch and an upper page (UP) parity latch. In process 1600, there may be one LP parity latch 594*a* per bit in the lower data page. In process 1600, there may be one UP parity latch 594*a* per bit in the upper data page. The process 1400 is one embodiment of steps 802-806 of FIG. 8.

In step 1402, default values are loaded into the LP and UP parity latches 594*a*. The default values could be a zero or a one for each latch for example. In step 1404, a word line counter is initialized (i=0). The word line counter is used to count the number of word lines in the group that are associated with the parity bits being generated.

In step 1406, the lower and upper page data for WLi is loaded into the data latches 594*b*. The data latches 594*b* may have a lower page latch (LDL) and an upper page latch (UDL) associated with each bit line. Thus, for each bit line, one bit from the lower page and one bit for the upper page may be stored in the data latches 594*b*.

In step 1408, each LP parity latch 594*a* is assigned the present value of the LP parity latch 594*a* XORed with the data from the corresponding lower page data latch 594*b* for that bit line. In step 1410, each UP parity latch 594*a* is assigned the present value of the UP parity latch 594*a* XORed with the data from the corresponding upper page data latch 594*b* for that bit line. In one embodiment, step 1408 performs a bitwise XOR.

In step 1412, word line WLi is programmed using the data from the data latches 594*b*. There are numerous techniques for programming two pages per word line. Note that when programming two pages per word line, the memory cells may be programmed to one of four states (e.g., Er, A, B, C), with state Er being an Erase state. In one embodiment, some of the memory cells are first programmed to an intermediate state. For example, memory cells targeted for the B- and C-states may be programmed to an intermediate state in a first programming pass. Then, in a second programming pass, memory cells targeted for the C-state are programmed from the intermediate state to the C-state and memory cells targeted for the A-state are programmed form the erased state to the A-state. In one embodiment, memory cells are programmed directly from the Er-state to the A-, B-, or C-state. Other programming sequences may be used.

In step 1414, the word line counter is incremented. Note that in this example by incrementing the counter by one, it is implied that the parity is based on data being stored in both odd and even word lines. The counter could be incremented by a number other than one. Alternatively, the counter might be decremented. An example in which the parity is based on only odd or only even word lines is discussed below.

In step 1416, it is determined whether all of the word lines in the group have been programmed. If programming is not yet complete, the process returns to step 1406 to load the next data pages. That is, the lower and upper pages for the next word line to be programmed are loaded. Note that when step 1408 is performed, this is based on the present value in the LP and UP parity latches 594*a* and the present data for the lower and upper pages being programmed.

When step 1416 determines that all word lines have been programmed, then the parity WL is programmed using the data from the LP and UP parity latches 594*a*, in step 1418. Note that this programming may store two parity bits per memory cell. One parity bit may be for the lower pages being programmed on each word line, and the other for the upper pages. The parity WL may also store ECC that is based on the parity bits stored in the parity WL. In one embodiment, the ECC is generated on a per page basis. Thus, one set of Error Correction Codes may be generated for the lower page parity bits, and a second set for the upper page parity bits. Note that it is not required that the word lines be programmed sequentially. Therefore, it will be understood that programming word lines in a sequence from WL0 to WLn is for purpose of illustration.

Figure 15:
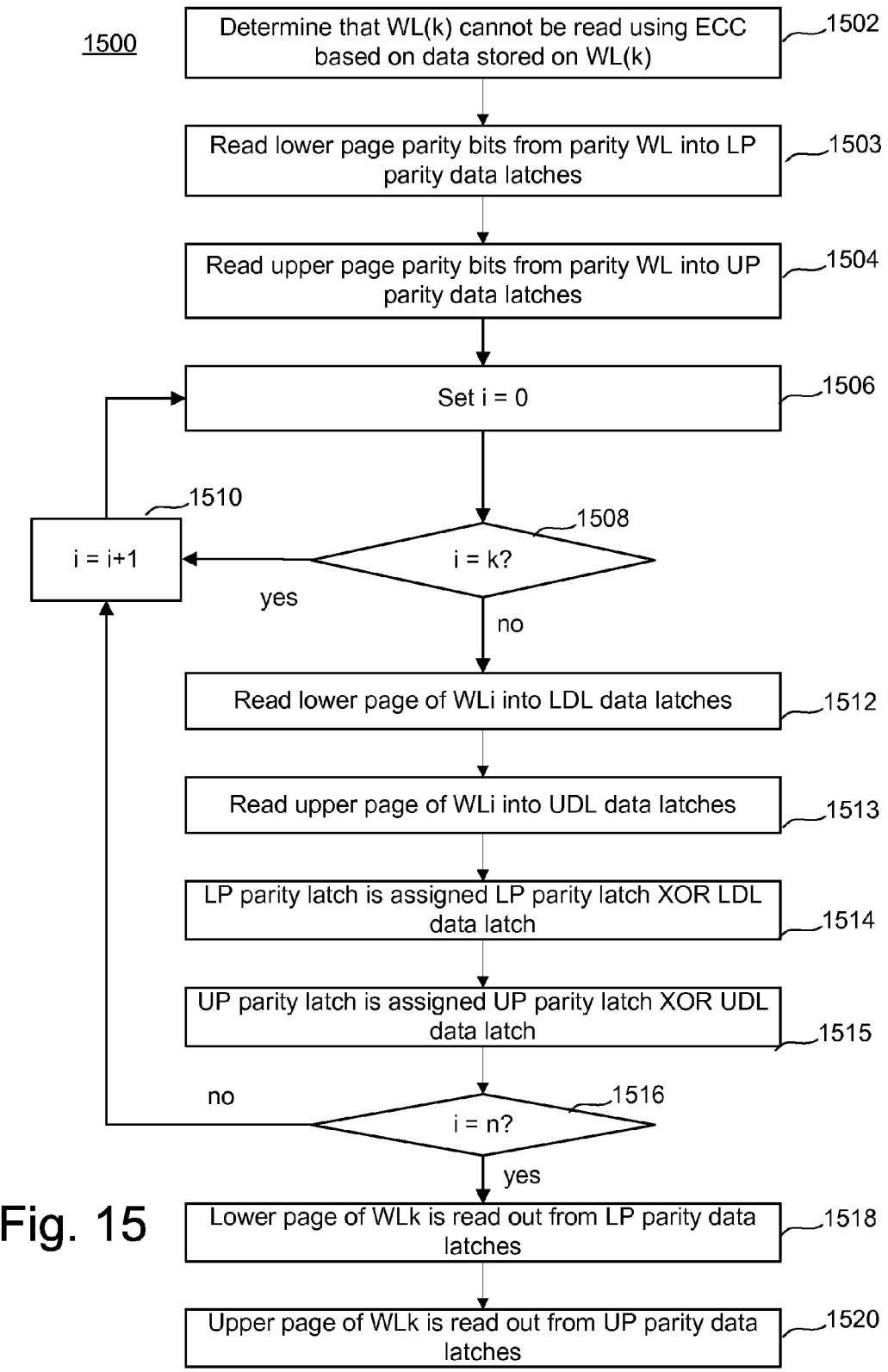
FIG. 15 is a flowchart of one embodiment of a process of recovering data that was stored in a word line.

FIG. 15 is a flowchart of one embodiment of a process 1500 of recovering data that was stored in a word line. Process 1500 is one embodiment of steps 808-814 of FIG. 8. Process 1500 describes using two sets of parity bits from one parity word line to recover two pages of data that were stored in one word line. Process 1500 may be used when process 1400 was used to store the parity bits. Process 1500 uses two parity latches 594*a* per bit line (e.g., LP parity latch and UP parity latch).

In step 1502, a determination is made that a selected word line cannot be read using ECC based on data stored on that word line. As one example step 1110 determined that a read error was uncorrectable. Note that when reading a word line with two pages it may be that one or both pages are unrecoverable. For the sake of discussion, it will be assumed that neither page can be read. This may be the case if there is some sort of severe defect on the word line such as a short between the word line and the substrate. If one of the pages can be read with other techniques (such as ECC stored on the word line being read), then process 1500 may be modified to only recover the page that cannot otherwise be read.

In step 1503, lower page parity bits are read from the parity word line that is associated with the word line for which the data cannot be read. Step 1503 may include reading one bit per memory cell on the parity word line. In one embodiment, Error Correction Codes are stored on the parity word line. The controller 244 may use these ECC to correct any possible misreads on the parity word line itself. Then, the corrected data (e.g., corrected parity bits) may be stored in the LP parity latches 594a.

In step 1504, upper page parity bits are read from the parity word line that is associated with the word line for which the data cannot be read. Step 1504 may include reading one bit per memory cell on the parity word line. In one embodiment, Error Correction Codes are stored on the parity word line. The controller may use these ECC to correct any possible misreads. Then, the corrected data may be stored in the UP parity latches 594a.

In step 1506, a word line counter is initialized (i=0). The word line counter is used to count the number of word lines in the group that are associated with the parity bit word line. As discussed above, the parity bits were calculated based on data stored in some specific group of word lines.

In step 1508, a determination is made whether the word line counter is equal to the number of the word line (WL(k)) that cannot be read. If so, then further processing is skipped and the process goes to step 1510, where the word line counter is incremented (i=i+1). Note that an increment other than one might be used in some cases. If the word line count does not equal the word line that cannot be read, then processing continues in step 1512.

In step 1512, lower page data for WLi is loaded into LDL data latches 594b. Step 1512 may include using Error Correction Codes that are stored on WLi to correct misreads. In step 1513, upper page data for WLi is loaded into UDL data latches 594b. Step 1513 may include using Error Correction Codes that are stored on WLi to correct misreads. Note that the upper page may be a different set of Error Correction Codes than the lower page. For example, there may be one set of codes per page.

In step 1514, each LP parity latch 594a is assigned the present value of the LP parity latch 594a XORed with the data from the LDL data latch 594b for that bit line. In step 1515, each UP parity latch 594a is assigned the present value of the UP parity latch 594a XORed with the data from the UDL data latch 594b for that bit line. In one embodiment, step 1514 includes performing a bitwise XOR.

In step 1516, the word line counter is compared to a value of the group size ("n") to determine whether all word lines in the group have been processed. Is not, then the word line counter is incremented in step 1510. The process then continues with step 1516.

When step 1516 determines that all word lines have been processed, then the lower page data is recovered by reading out that data from the LP parity latches 594a, in step 1518. Also, upper page data is recovered by reading out that data from the UP parity latches 594a, in step 1520. As noted, process 1500 could be modified to recover only the upper page or only the lower page.

Figure 16A:
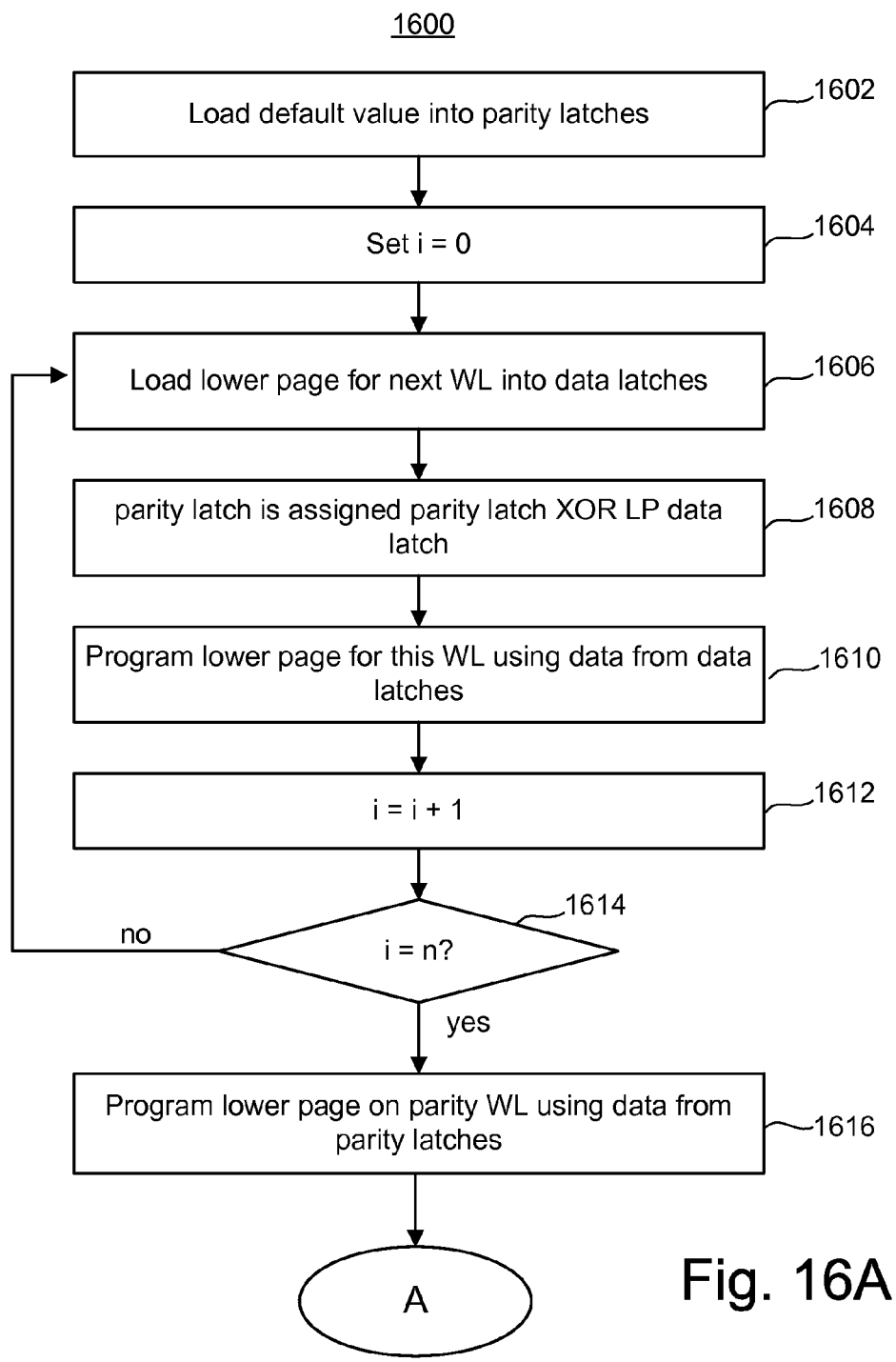
FIG. 16A is a flowchart of one embodiment of a process of calculating and storing parity bits, based on a first of two pages being programmed per word line.
Figure 16B:
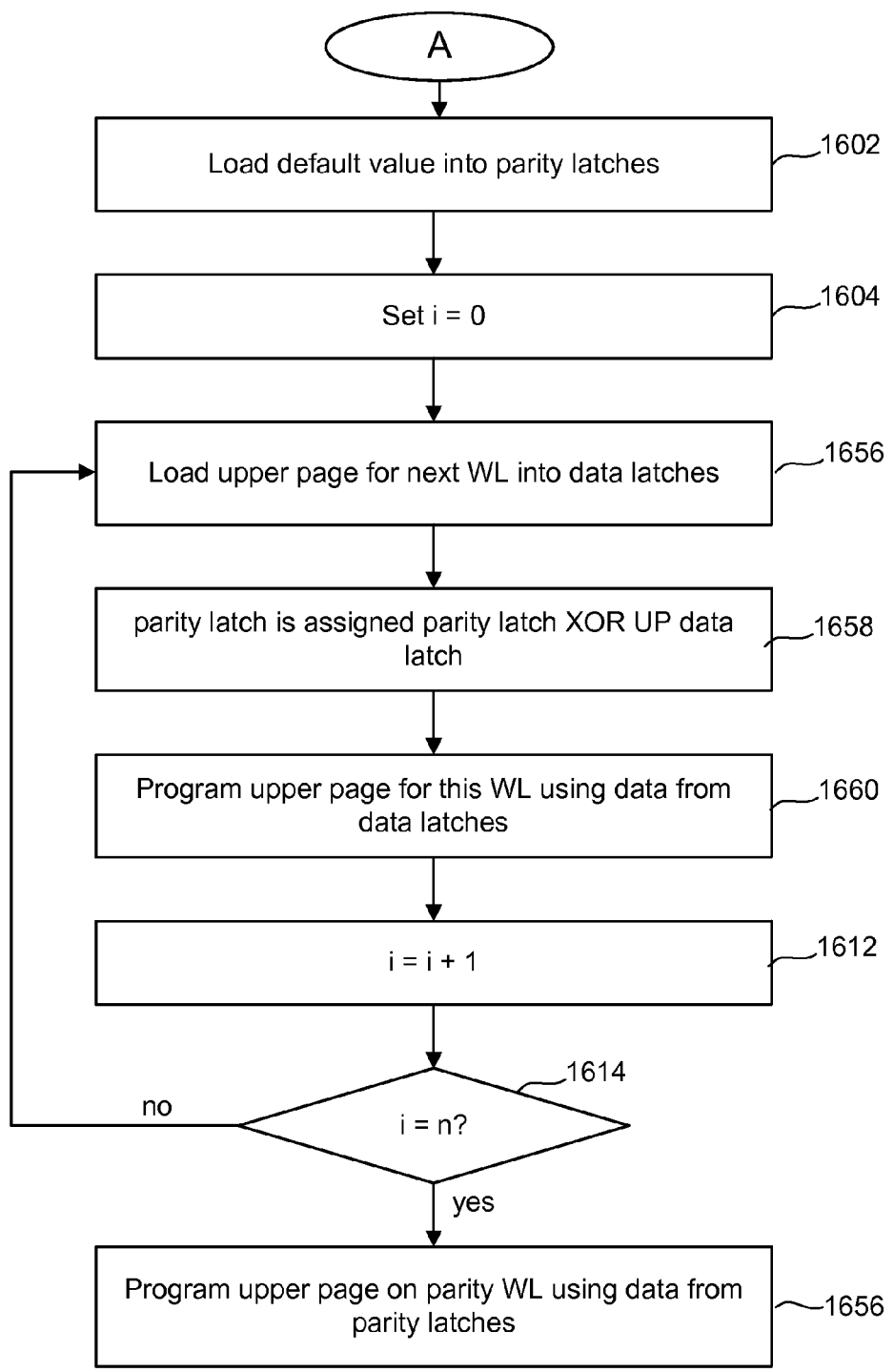
FIG. 16B is a flowchart of one embodiment of a process of calculating and storing parity bits, based on a second of two pages being programmed per word line.

FIGS. 14 and 15 described techniques in which two parity latches 594a are used when programming two pages per word line. In one embodiment, a single parity latch 594a per bit line may be used when programming and/or recovering two data pages. FIG. 16A is a flowchart of one embodiment of a process 1600 of calculating and storing parity bits, based on a first of two pages being programmed per word line. The process may store the parity bits on a single parity word line. In process 1600, a single parity latch 594a is used per bit line. The process 1600 is one embodiment of steps 802-806 of FIG. 8. FIG. 16B is a flowchart of one embodiment of a process 1650 of calculating and storing parity bits, based on a second of two pages being programmed per word line.

The process of FIG. 16A may be used to program all lower pages and store parity bits for the lower pages in a parity word line. Then, the process of FIG. 16B may be used to program all upper pages and store the parity bits for the upper pages in the same parity word line.

In step 1602, default values are loaded into the parity latches 594a. The default values could be a zero or a one for each latch, for example. In step 1604, a word line counter is initialized (i=0). The word line counter is used to count the number of word lines in the group that are associated with the parity bits being generated.

In step 1606, the lower page data for WLi is loaded into the data latches 594b. Note that even though only one page is being programmed at a time, the data could be loaded into a lower page data latch (e.g., LDL latch) to facilitate programming.

In step 1608, each parity latch 594a is assigned the present value of the parity latch 594a XORed with the data from the corresponding data latch 594b (which stores lower page data) for that bit line.

In step 1610, word line WLi is programmed using the lower page data from the data latches 594b.

In step 1612, the word line counter is incremented. Note that in this example by incrementing the counter by one, it is implied that the parity is based on data being stored in both odd and even word lines. The counter could be incremented by a number other than one. Alternatively, the counter might be decremented. An example in which the parity is based on only odd or only even word lines is discussed below.

In step 1614, it is determined whether all of the word lines in the group have been programmed. If programming is not yet complete, the process returns to step 1606 to load the next data page. That is, the lower page data for the next word line to be programmed are loaded. Note that when step 1608 is next performed, this is based on the present value in the parity latches 594a and the present data for the lower page being programmed.

When step 1614 determines that all word lines have been programmed, then a lower page is programmed onto the parity WL using the data from the parity latches, in step 1616. Note that this programming may store one parity bit per memory cell. This parity bit may be for the lower pages being programmed on each word line. The parity WL may also store ECC that is based on the parity bits stored in the parity WL.

As noted, after programming the lower page data for all of the word lines in the group associated with the parity word line, the upper page data may be programmed. The process of FIG. 16B may be used to program all upper pages and store parity bits for the upper pages in a parity word line. The process of FIG. 16B is similar to the one of FIG. 16A, with a difference being that upper pages are programmed instead of lower pages. Therefore, similar reference numerals are used for similar steps. In view of this, the process will not be discussed in detail. Note that in step 1656 when upper page data is stored into data latches, the data could be stored in an upper page data latch (e.g., UDL). Also note that the lower page data could also be loaded into lower page data latches (e.g., LDL). This may facilitate programming, depending on how programming is performed in step 1660. However, the lower page data is not needed to calculate the parity bits for the upper pages, in step 1658.

When step 1614 determines that all word lines have been programmed, then an upper page is programmed onto the parity WL using the data from the parity latches, in step 1656. Note that this programming may store one parity bit per memory cell. This parity bit may be for the upper pages being programmed on each word line. The parity WL may also store ECC that is based on these parity bits stored in the parity WL. Note that by combining the process of FIG. 16A with 16B, the same parity WL may store lower page parity bits and upper page parity bits. Each memory cell may store one parity bit for the lower pages and one parity bit for the upper pages.

Figure 17A:
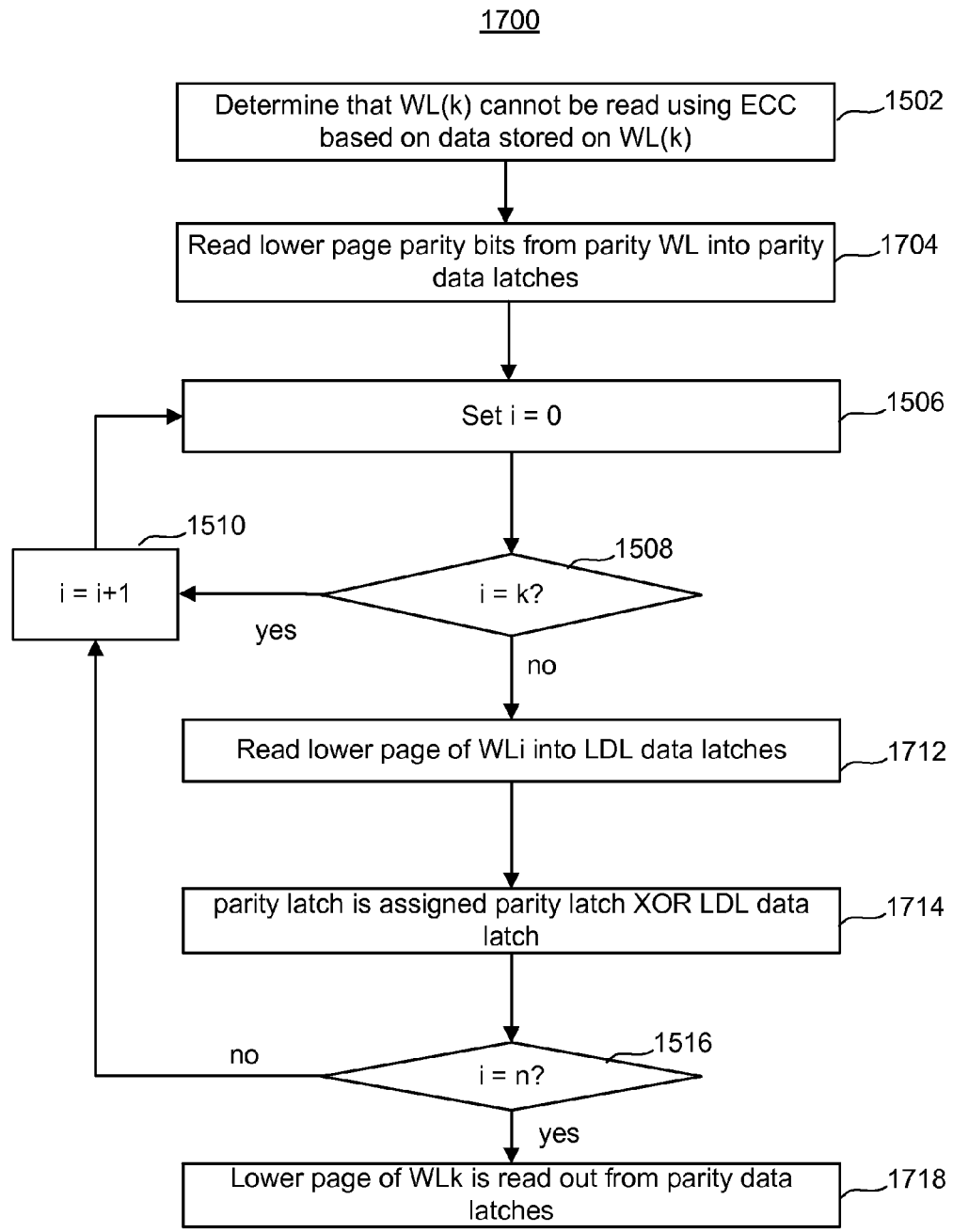
FIG. 17A is a flowchart of one embodiment of a process of recovering lower page data that was stored in a word line.

FIG. 17A is a flowchart of one embodiment of a process 1700 of recovering lower page data that was stored in a word line. Process 1700 may be used when the process of FIG. 16A was used to store the parity bits for lower page data. Process 1700 needs only one parity latch 594*a* per bit line. Process 1700 needs only one parity latch 594*a* per bit in a data page. Because some steps of process 1700 are similar to process 1500, similar reference numerals are used. Also, some steps of process 1700 will not be described in detail. Process 1700 is one embodiment of steps 808-814 of FIG. 8.

In step 1704, lower page parity bits are read from the parity word line that is associated with the word line for which the data cannot be read. Step 1704 may include reading one bit per memory cell on the parity word line. Note that this may include reading one page of two pages stored on the parity bit word line. In one embodiment, Error Correction Codes are stored on the parity word line. The controller may use these ECC to correct any possible misreads. Then, the corrected data may be stored in a single parity latch 594*a* per bit line.

In step 1712, lower page data for WLi is loaded into LDL data latches 594*b*. Since only one page of data is being read, it may not be necessary to distinguish between a lower page data latch and an upper page data latch. In step 1714, each parity latch 594*a* is assigned the present value of the parity latch 594*a* XORed with the data from the LDL data latch 594*b* for that bit line. In one embodiment, a bitwise XOR is performed. When step 1516 determines that all word lines have been processed, then the lower page data is recovered by reading out that data from the parity latches 594*a*, in step 1718.

Figure 17B:
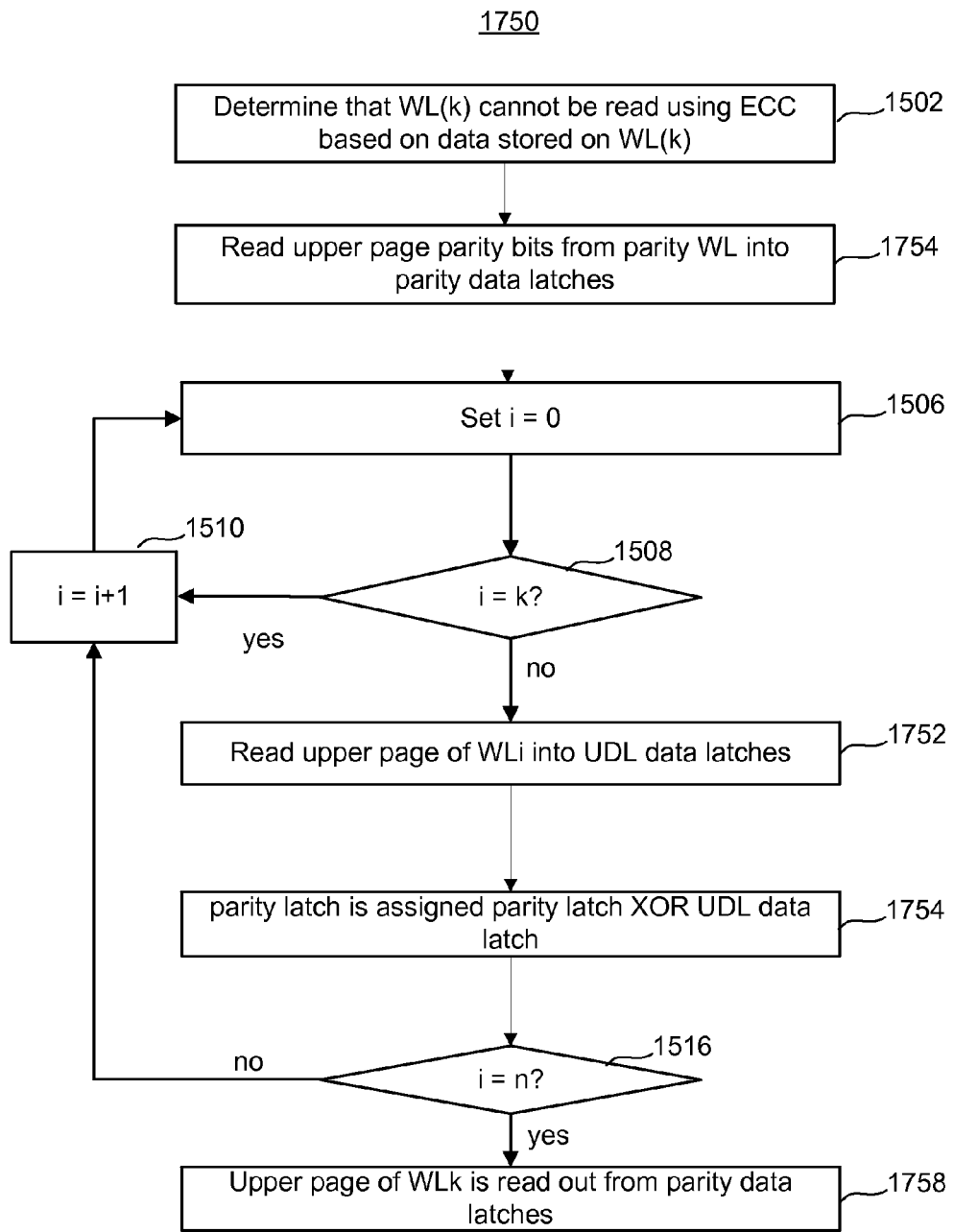
FIG. 17B is a flowchart of one embodiment of a process of recovering upper page data that was stored in a word line.

FIG. 17B is a flowchart of one embodiment of a process 1750 of recovering upper page data that was stored in a word line. Process 1750 may be used when the process of FIG. 16B was used to store the parity bits for upper page data. Process 1750 needs only one parity latch 594*a* per bit line. Process 1750 needs only one parity latch 594*a* per bit in a data page. Because some steps of process 1750 are similar to process 1500, similar reference numerals are used. Process 1750 is one embodiment of steps 808-814 of FIG. 8. Also note that process 1750 is similar to process 1700. However, in step 1754 upper page parity bits are read from the parity bit word line, instead of reading lower page bits. Note that the upper page parity bits may be read from the same parity bit word line used for lower page parity bits in the recovery process of FIG. 17A. Also, the latches used in step 1754 may be the same ones used in step 1704 of FIG. 17A.

In step 1752, upper page data of WLi is read into UDL latches. Note that it may not be absolutely necessarily to distinguish between LDL and UDL data latches. In step 1754, the parity latch is assigned the bit in the parity latch XORed with the bit in the UDL data latch. In one embodiment, a bitwise XOR is performed. In step 1758, the upper page of WLk is read out from the parity data latches 594*a*.

In some embodiments, odd word lines are associated with one parity word line and even word lines are associated with another parity word line. The can be used to recover data when two neighboring word lines are each defective. Sometimes two neighboring word lines will short together, which may prevent reading of either word line even if ECC such as in step 1110 is used.

Figure 18:
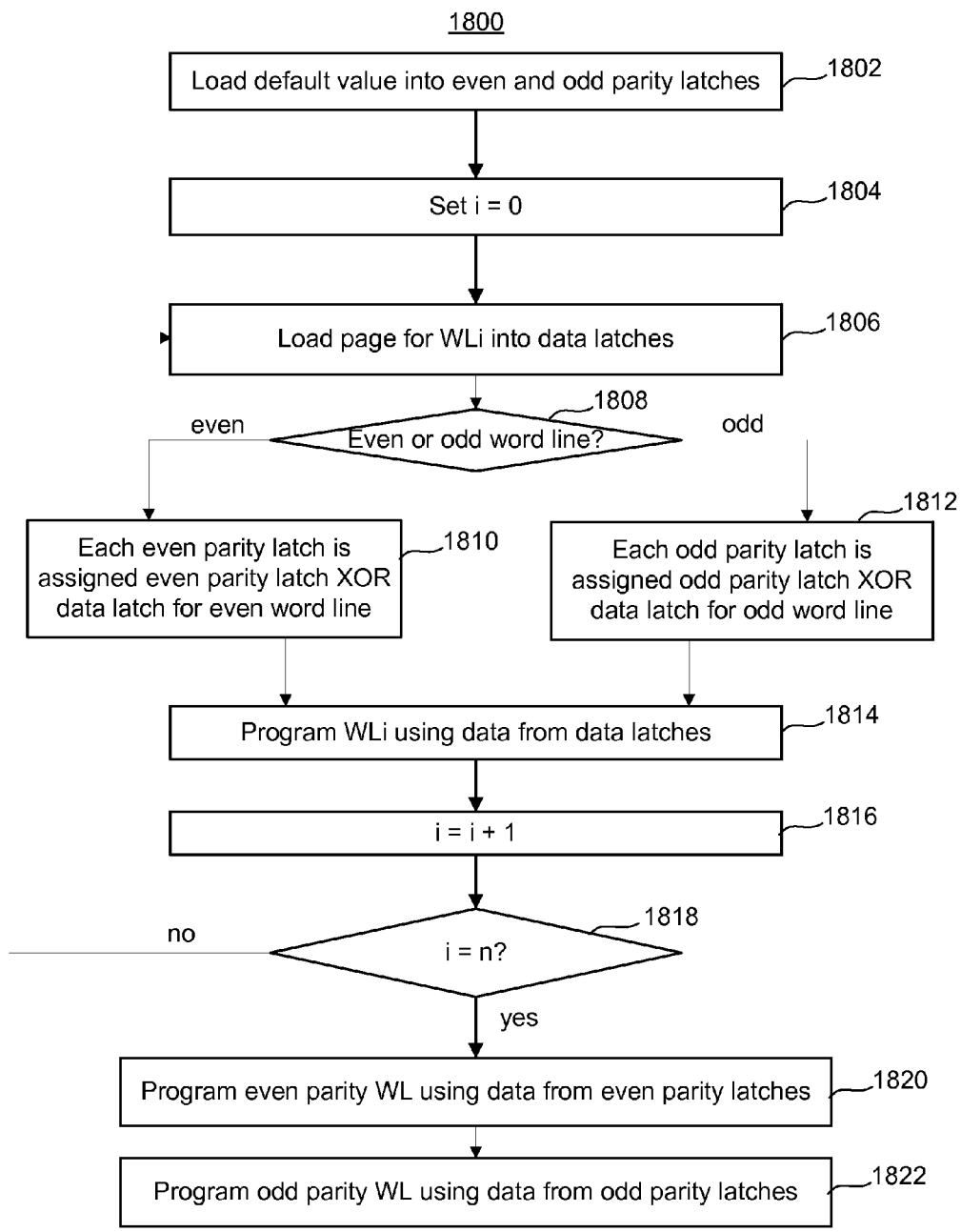
FIG. 18 is a flowchart of one embodiment of a process in which two parity word lines are stored.

FIG. 18 is a flowchart of one embodiment of a process 1800 in which two parity word lines are stored. One parity word line is for odd pages being programmed, and the other is for even word lines being programmed. In one embodiment of process 1800, a single page is programmed per word line. In one embodiment, each memory cell stores a single bit. In some embodiments, multiple pages are stored per word line. An example in which multiple pages are stored per word line is discussed below. FIG. 9B shows one scheme that may be used with process 1800. In process 1800, two parity latches 594*a* are used per bit line. These two latches will be referred to as an even parity latch and an odd parity latch. The process 1800 is one embodiment of steps 802-806 of FIG. 8.

In step 1802, default values are loaded into the odd and even parity latches 594*a*. The default values could be a zero or a one for each latch for example. In step 1804, a word line counter is initialized (i=0). The word line counter is used to count the number of word lines in both groups (odd and even) of word lines being programmed.

In step 1806, the page data for WLi is loaded into the data latches 594*b*. This might be data for a single page (e.g., memory cells store a single bit). Alternatively, this might be either lower or upper page data.

In step 1808, a determination is made whether the page being programmed is an even or an odd word line. If the word line is even, then each even parity latch is assigned the present value of the even parity latch 594*a* XORed with the data from the corresponding data latch 594*b* for that bit line, in step 1810. If the word line is odd, then each odd parity latch is assigned the present value of the odd parity latch 594*a* XORed with the data from the corresponding data latch 594*b* for that bit line, in step 1812. A bitwise XOR may be performed in steps 1810 and 1812.

In step 1814, word line WLi is programmed using the data from the data latches 594*b*. In step 1816, the word line counter is incremented. In step 1816, it is determined whether all of the word lines have been programmed. If programming is not yet complete, the process returns to step 1806 to load the next data pages.

When step 1818 determines that all word lines have been programmed, then the even parity WL is programmed using the data from the even parity latches, in step 1820. Note that this programming may store one parity bit per memory cell. This parity bit may be for all of the even word lines that were programmed. The even parity WL may also store ECC that is based on the parity bits stored in the even parity WL.

In step 1822, the odd parity WL is programmed using the data from the odd parity latches. Note that this programming may store one parity bit per memory cell. This parity bit may be for all of the odd word lines that were programmed. The odd parity WL may also store ECC that is based on the parity bits stored in the odd parity WL.

Figure 19A:
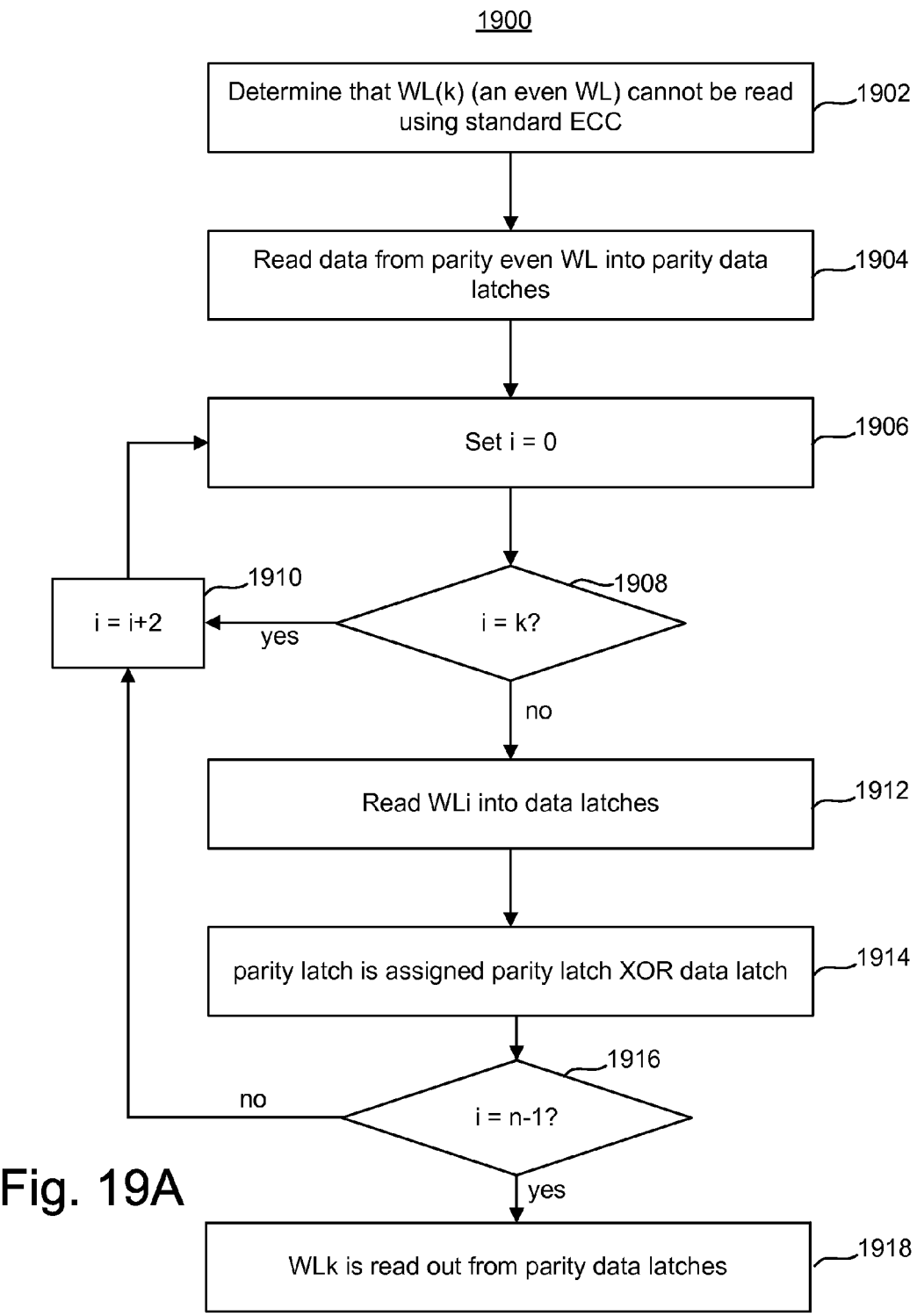
FIG. 19A is a flowchart of one embodiment of a process of recovering data stored in any of the even word lines using the parity bits stored in the even parity word line.
Figure 19B:
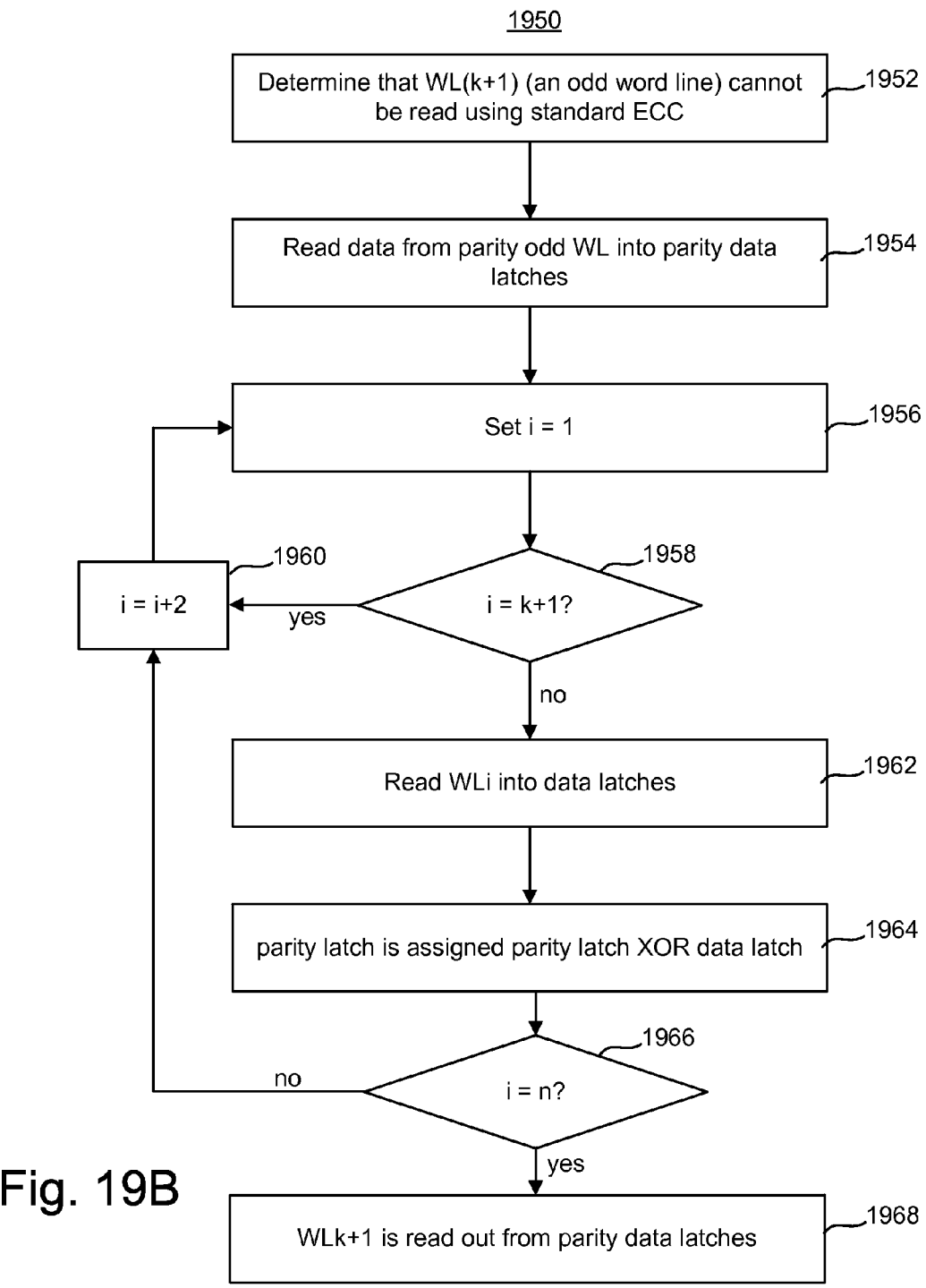
FIG. 19B is a flowchart of one embodiment of a process of recovering data stored in any of the odd word lines using the parity bits stored in the odd parity word line.

After storing the parity bits using process 1800 there may be an error in which one or more word lines cannot be read. For the sake of illustration two adjacent word lines may short together, making the data on each word line unreadable using only ECC based on data stored on those word lines. FIG. 19A is a flowchart of one embodiment of a process of recovering data stored in any of the even word lines using the parity bits stored in the even parity word line. FIG. 19B is a flowchart of one embodiment of a process of recovering data stored in any of the odd word lines using the parity bits stored in the odd parity word line. These two processes can be used together to recover data when any even word line and any odd word line cannot be otherwise read. The processes could also be used separately when there is just a single word line that cannot otherwise be read.

FIG. 19A is similar to the recovery process 1300 from FIG. 13. In step 1902, it is determined that an even word line (WL(k)) cannot be read using other recovery techniques. Those other techniques may include using ECC that is based only on data that was programmed on the word line that cannot be read. In step 1904, data is read from the even parity word line (or even parity word line) into the parity data latches 594a. In step 1906, the word line counter is initialized to zero. In step 1908, a determination is made whether the present word line being processed is the defective (unreadable) word line. If so, the word line counter is incremented by 2 in step 1910. Otherwise, the present word line is read into the data latches in step 1912. In step 1914, each parity latch is updated by taking the XOR between the present bit in the parity latch and the bit in the associated data latch. In step 1916, it is determined whether this is the last even word line (i=n−1). If not, the word line counter is incremented by 2 in step 1910. Otherwise, the data from WLk is read is from the parity latches 594a, in step 1918.

Process 1950 of FIG. 19B is similar to the recovery process 1900 from FIG. 19A. However, it is for recovering an odd word line instead of an even word line. In step 1952, it is determined that an odd word line (WL(k+1)) cannot be read using other recovery techniques. Those other techniques may include using ECC that is based only on data that was programmed on the word line that cannot be read. In step 1954, data is read from the odd parity word line (or odd parity word line) into the parity data latches 594a. In step 1956, the word line counter is initialized to one. In step 1958, a determination is made whether the present word line being processed is the defective (unreadable) word line. If so, the word line counter is incremented by 2 in step 1960. Otherwise, the present word line is read into the data latches in step 1962. In step 1964, each parity latch is updated by taking the XOR between the present bit in the parity latch and the bit in the associated data latch. In step 1966, it is determined whether this is the last odd word line (i=n). If not, the word line counter is incremented by 2 in step 1960. Otherwise, the data from WLk+1 is read is from the parity latches 594a, in step 1968.

Referring again to FIG. 18, that process 1800 may be used when multiple bits are stored per memory cell. In one embodiment, process 1800 is first used to program a lower page on all word lines (step 1814). In step 1820, the even parity WL is programmed with a lower page of parity bits. Likewise, the odd parity WL is programmed with a lower page of parity bits, in step 1822. Then, process 1800 is repeated for upper pages being programmed on the same word lines. When step 1820 is performed, the parity bits for the upper pages are programmed on the even parity word lines. When step 1822 is performed, the parity bits for the upper pages are programmed on the odd parity word lines.

Referring again to FIG. 19A, process 1900 may be used for recovering an even page of data when multiple pages are stored per word line. In one embodiment, process 1900 is first used to recover a lower page for the defective word line (step 1918). Then, process 1900 is used to recover an upper page for the defective word line (step 1918). In step 1904, when the even parity WL is read, either the lower page parity bits or the upper page parity bits are read. In step 1912, when WLi is read, either the lower page or the upper page is read.

Referring again to FIG. 19B, process 1950 may be used for recovering an odd page of data when multiple pages are stored per word line. In one embodiment, process 1950 is first used to recover a lower page for the defective word line (step 1968). Then, process 1950 is used to recover an upper page for the defective word line (step 1968). In step 1954, when the odd parity WL is read, either the lower page parity bits or the upper page parity bits are read. In step 1962, when WLi is read, either the lower page or the upper page is read.

Note that the group of word lines that are associated with the parity word line may be of any size. In some cases, the data from more than one block of word lines is used when calculating the parity bits. In some cases, only a few word lines are programmed at a time. Therefore, generating the parity bits may not be as crucial. In one embodiment, a determination is made as to how many word lines are being programmed to determine how to go about generating and storing parity bits.

Figure 20:
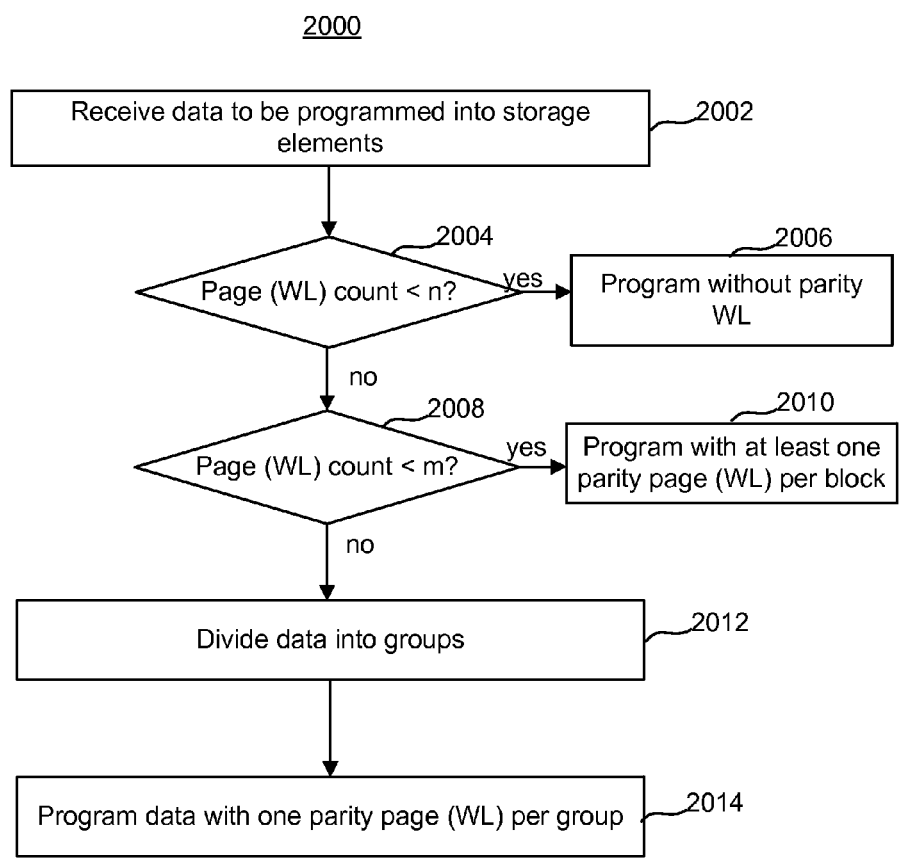
FIG. 20 is a flowchart illustrating one embodiment of a process of generating and storing parity bits based on the number of pages being programmed.

FIG. 20 is a flowchart illustrating one embodiment of a process 2000 of generating and storing parity bits based on the number of pages being programmed. The determination could alternatively be based on how many word lines are being programmed. In step 2002, data to be programmed into storage elements is received. The data may be a certain number of pages.

In step 2004, the page count is compared to a first threshold "n". Later in the process a second threshold "m" is used. Typically, n is less than m. As one example, n could be a relatively small number such as a few pages. As noted, the test could be for word lines instead. If the page count (or word line count) is low (less than n), then the pages are programmed without generating and storing parity bits, in step 2006. The process 2000 then concludes.

Otherwise, the page count (or word line count) is compared to the second threshold, m. The second threshold could be one more than the block size, as one example. If the page count is less than m, then the data is programmed with at least one parity page. In one embodiment, exactly one parity page is generated and stored for the data if there is one bit stored per memory cell. In one embodiment, exactly two parity pages (e.g., odd and even) is generated and stored for the data if there is one bit stored per memory cell. In this latter embodiment, there could be an odd parity page for odd word lines and an even parity page for even word lines.

If the page count (or word line count) is larger than m, then the data may be divided into groups in step 2012. For example, the data could be divided into groups of 100 pages. This group will serve as the group for which parity is calculated and stored. Thus, there may be 100 pages in the group. Alternatively, there may be 100 word lines in a group. In either example, a single parity word line may be used to stored parity for all data in the group. In one embodiment, the controller 244 divides the data into groups.

In step 2014, the data is programmed with one parity page (or one parity word line) per group. Referring to FIG. 9C, the group could contain all word lines in Block n and word lines WL0 to WL n−4 in Block n+1. There might be a single parity word line (e.g., WL n−3_for the group. The parity word line might contain one page of parity bits, two pages of parity bits, etc., depending on how many pages are stored on each word line.

In some cases, parity bits may have already been stored in a parity word line for some of the word lines in a group prior to beginning to program other word lines in the group associated with the parity word line. As one example sometimes a relatively small number of word lines in a block are programmed at a time. A parity word line may, or may not, have been started when word lines are programmed a few at a time.

Figure 21:
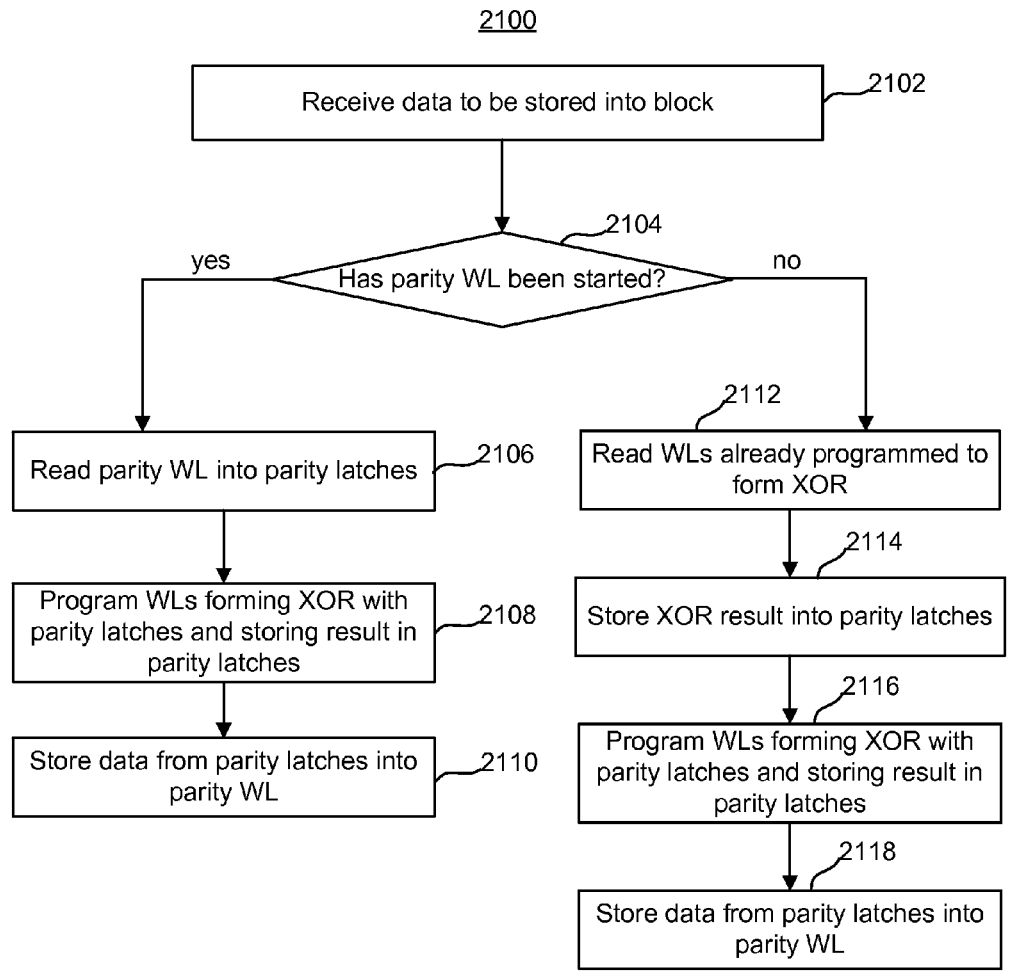
FIG. 21 is a flowchart of a process of storing parity bits in cases when data might already have been stored in some of the word lines in a block.

FIG. 21 is a flowchart of a process 2100 of storing parity bits in cases when data might already have been stored in some of the word lines in a block. In step 2102 data to be stored in a block is received. In step 2104, a determination is made whether a parity bit word line has already been started. If it has, then the parity WL is read into the parity latches 594a, in step 2106. Then, in step 2108, the word lines are programmed while forming a bitwise XOR between the parity latches and the data for each word lines, as has been previously described herein. This could be for one bit per memory cell, two bits, etc. If could be based on even and odd word line groups. In step 2110, the final data from the parity latches are stored to the parity WL. Note that this is the same parity WL as step 2106.

In some cases, even though one or more word lines have been programmed, the parity WL has not yet been started. This may be the case if a small number of word lines were programmed, such as in step 2006 of FIG. 20. In this case, the previously programmed word lines are read one at a time, each time forming an XOR with the present value of the parity latches. Initially, the parity latches are set to a default value. This is similar to the process already described of forming the XOR when programming word lines. The XOR result is stored in the parity latches 594a after reading each word line, in step 2114.

After all of the previously programmed word lines have been read, and an XOR result is stored in the parity latches 594a, then the word lines are programmed in step 2116. While programming, the new data being programmed is XORed with the present value of the parity latches 594a, as has been previously described herein. For example, a new XOR result is produced for each word line. After programming is complete, the final result from the parity latches 594a is stored to the parity WL.

One embodiment includes method of operating non-volatile storage in which data is recovered from a word line. The method includes the following. Data is programmed into a plurality of non-volatile storage elements associated with a group of word lines in a memory array. A plurality of parity bits are calculated for the data. Each parity bit is calculated from data for a set of the non-volatile storage elements that includes one non-volatile storage element associated with each word line in the group. The plurality of parity bits are stored in an additional word line in the memory array. In response to determining that a first word line in the group of word lines has a read error the following is performed to recover the data. The plurality of parity bits are accessed from the additional word line in the memory array. Data is read from the non-volatile storage elements associated with all of the word lines in the group but the first word line. Data that was stored in non-volatile storage elements associated with the first word line is recovered based on the plurality of parity bits and the data read from the non-volatile storage elements associated with all of the word lines in the group but the first word line.

One embodiment includes a non-volatile storage device, comprising a plurality of non-volatile storage elements, a plurality of word lines associated with the plurality of non-volatile storage elements, and one or more managing circuits in communication with the plurality of word lines. The one or more managing circuits program data into non-volatile storage elements associated with a group of the word lines. The one or more managing circuits calculate a plurality of parity bits for the data. Each parity bit is calculated from data for a set of the non-volatile storage elements that includes one non-volatile storage element associated with each word line in the group. The one or more managing circuits store the plurality of parity bits in a first of the word lines. In response to determining that a selected word line in the group of word lines has a read error the one or more managing circuits access the plurality of parity bits from the first word line, read data in the non-volatile storage elements associated with all of the word lines in the group but the first word line, and recover data that was stored in non-volatile storage elements associated with the selected word line based on the plurality of parity bits and the data read from the non-volatile storage elements associated with all of the word lines in the group but the selected word line.

One embodiment includes a method of operating non-volatile storage comprising the following. A plurality of pages of data are programmed into non-volatile storage elements that are associated with a plurality of word lines and a plurality of bit lines in a memory array. The non-volatile storage elements are arranged as NAND strings. Each of the pages is programmed into non-volatile storage elements associated with a single one of the word lines. For each corresponding bit of each of the pages, a parity bit is calculated for the corresponding bit of each of the pages to generate a plurality of parity bits. Each parity bit is for a group of the non-volatile storage elements that are associated with a single one of the bit lines. The plurality of parity bits are stored in non-voltage storage elements associated with a word line in the memory array other than the plurality of word lines. A determination is made that a selected word line of the plurality of word lines has a read error that cannot be recovered using ECC correction based only on codes generated from data stored in the selected word line. The plurality of parity bits are accessed from the other word line in the memory array. The pages of data are read from the non-volatile storage elements associated with all of the word lines in the plurality but the selected word line. A page of data is recovered for the selected word line based on the plurality of parity bits and the pages of data read from the non-volatile storage elements associated with all of the word lines in the group but the selected word line.

One embodiment includes a non-volatile storage device, comprising a plurality of non-volatile storage elements arranged as NAND strings, a plurality of bit lines associated with the plurality of non-volatile storage elements, a plurality of word lines associated with the plurality of non-volatile storage elements, and one or more managing circuits in communication with the plurality of bit lines and the plurality of word lines. The one or more managing circuits program a plurality of pages of data into a set of the plurality of non-volatile storage elements, each of the pages is programmed into non-volatile storage elements associated with a single one of the plurality of word lines. For each corresponding bit of each of the pages the one or more managing circuits calculate a parity bit for the corresponding bit of each of the pages to generate a plurality of parity bits. Each parity bit is for a group of the non-volatile storage elements that are associated with a single one of the bit lines. The one or more managing circuits store the plurality of parity bits in non-voltage storage elements associated with a first word line of the plurality of word lines. The one or more managing circuits detect that a selected word line of the plurality of word lines has a read error that cannot be recovered using ECC correction based only on codes generated from data stored in the selected word line. The one or more managing circuits access the plurality of parity bits from the first word line in response to detected the read error. The one or more managing circuits read the pages of data from the non-volatile storage elements associated with all of the programmed word lines but the selected word line. The one or more managing circuits recover a page of data for the selected word line based on the plurality of parity bits and the pages of data read from the non-volatile storage elements associated with all of the programmed word lines but the selected word line.

The foregoing detailed description has been presented for purposes of illustration and description. It is not intended to be exhaustive or to limit embodiments to the precise form disclosed. Many modifications and variations are possible in light of the above teaching. The described embodiments were chosen in order to best explain principles and practical application, to thereby enable others skilled in the art to best utilize the various embodiments and with various modifications as are suited to the particular use contemplated. It is intended that the scope be defined by the claims appended hereto.

What is claimed is:

1. A method of operating non-volatile storage comprising:
   programming data into a plurality of non-volatile storage elements associated with a group of word lines in a memory array;
   calculating a plurality of parity bits for the data, each parity bit is calculated from data for a set of the non-volatile storage elements that includes one non-volatile storage element associated with each word line in the group;
   storing the plurality of parity bits in an additional word line in the memory array;
   in response to determining that a first word line in the group of word lines has a read error that was not recovered based on information stored on the first word line:
      accessing the plurality of parity bits from the additional word line in the memory array;
      reading data in the non-volatile storage elements associated with all of the word lines in the group but the first word line; and
      recovering data that was stored in non-volatile storage elements associated with the first word line based on the plurality of parity bits and the data read from the non-volatile storage elements associated with all of the word lines in the group but the first word line.

2. The method of claim 1, wherein the plurality of non-volatile storage elements are associated with a plurality of bit lines, each set of the non-volatile storage elements for which a parity bit is calculated is formed from non-volatile storage elements associated with one of the bit lines.

3. The method of claim 2, wherein the calculating a plurality of parity bits includes:
   forming an XOR between the data being stored in a first of the non-volatile storage elements in a first set associated with a first of the bit lines and a data latch that stores a present value for a first of the plurality of parity bits; and
   repeating the forming an XOR for data to be stored in all other non-volatile storage elements in the first set and the present value of the first parity bit.

4. The method of claim 2, wherein the recovering data that was stored in non-volatile storage elements associated with the first word line includes:
   forming an XOR between a first of the parity bits that is associated with a first bit line of the bit lines and data from a first non-volatile storage element in a first set associated with the first bit line to form a present value of the first parity bit;
   repeating the forming an XOR between the present value of the first parity bit and data from non-volatile storage elements in the first set associated with all word lines in the group but the first word line; and
   using the final value of the first parity bit as the value for data from the non-volatile storage element in the first set associated with the first word line.

5. The method of claim 1, wherein the storing the plurality of parity bits in an additional word line in the memory array includes:
   storing the plurality of parity bits in a word line in the memory array that is dedicated to storing parity bits.

6. The method of claim 1, wherein the storing the plurality of parity bits in an additional word line in the memory array includes:
   receiving a unit of data that includes the data to be programmed in the plurality of non-volatile storage elements associated with the group of word lines in the memory array and other data;
   determining that the unit of data is larger than a threshold; and
   dividing the unit of data into sections for which parity bits will be stored in a single word line in the memory array in response to determining that the unit of data is larger than the threshold, the data stored in the non-volatile storage elements associated with the group of word lines are a first section of the sections, the group of word lines span multiple blocks in the memory array.

7. A method of operating non-volatile storage of claim 1, wherein the group of word lines includes all even word lines in a block of non-volatile storage elements, and further comprising:
   calculating a second plurality of parity bits for data stored in non-volatile storage elements associated with a second group of word lines that include all odd word lines in the block, each parity bit of the second plurality of parity bits is calculated from data for a set of the non-volatile storage elements that includes one non-volatile storage element associated with each word line in the second group;
   storing the second plurality of parity bits in a second additional word line in the memory array;
   in response to determining that a selected word line in the second group of word lines has a read error:
      accessing the second plurality of parity bits from the second additional word line in the memory array;
      reading data in the non-volatile storage elements associated with all of the word lines in the second group but the selected word line; and
      recovering data that was stored in non-volatile storage elements associated with the selected word line based on the second plurality of parity bits and the data read from the non-volatile storage elements associated with all of the word lines in the second group but the selected word line.

8. The method of claim 1, wherein the memory array is a three dimensional memory array.

9. A non-volatile storage device, comprising:
   a plurality of non-volatile storage elements;
   a plurality of word lines associated with the plurality of non-volatile storage elements; and
   one or more managing circuits in communication with the plurality of word lines, the one or more managing circuits program data into non-volatile storage elements associated with a group of the word lines, the one or more managing circuits calculate a plurality of parity bits for the data, each parity bit is calculated from data for a set of the non-volatile storage elements that includes one non-volatile storage element associated with each word line in the group, the one or more managing circuits store the plurality of parity bits in a first of the word lines, in response to determining that a selected word line in the group of word lines has a read error that was not recovered based on information stored on the selected word line the one or more managing circuits access the plurality of parity bits from the first word line, read data in the non-volatile storage elements associated with all of the word lines in the group but the first word line, and recover data that was stored in non-volatile storage elements associated with the selected word line based on the plurality of parity bits and the data read from the non-volatile storage elements associated with all of the word lines in the group but the selected word line.

10. The non-volatile storage device of claim 9, further comprising a plurality of bit lines associated with the plurality of non-volatile storage elements, each set of the non-volatile storage elements for which a parity bit is calculated is formed from non-volatile storage elements associated with one of the bit lines.

11. The non-volatile storage device of claim 10 wherein, when the one or more managing circuits calculate a plurality of parity bits, the one or more managing circuits form an XOR between the data being stored in a first of the non-volatile storage elements in a first set associated with a first of the bit lines and a data latch that stores a present value for a first of the plurality of parity bits, and the one or more managing circuits form an XOR for data to be stored in all other non-volatile storage elements in the first set and the present value of the first parity bit.

12. The non-volatile storage device of claim 10 wherein, when the one or more managing circuits recover data that was stored in non-volatile storage elements associated with the first word line the one or more managing circuits form an XOR between a first of the parity bits that is associated with a first bit line of the bit lines and data from a first non-volatile storage element in a first set associated with the first bit line to form a present value of the first parity bit, repeat the forming an XOR between the present value of the first parity bit and data from non-volatile storage elements in the first set associated with all word lines in the group but the first word line, and use the final value of the first parity bit as the value for data from the non-volatile storage element in the first set associated with the first word line.

13. The non-volatile storage device of claim 9, wherein the first word line is dedicated to storing parity bits.

14. The non-volatile storage device of claim 9 wherein, when storing the plurality of parity bits in a the first word line the one or more managing circuits receive a unit of data that includes the data to be programmed in the plurality of non-volatile storage elements associated with the group of word lines in the non-volatile storage device and other data, determine that the unit of data is larger than a threshold, and divide the unit of data into sections for which parity bits will be stored in a single word line in the non-volatile storage device in response to determining that the unit of data is larger than the threshold, the data stored in the non-volatile storage elements associated with the group of word lines are a first section of the sections, the group of word lines span multiple blocks in the non-volatile storage device.

15. The non-volatile storage device of claim 9 wherein the group of word lines includes all even word lines in a block of non-volatile storage elements, and the one or more managing circuits calculate a second plurality of parity bits for data stored in non-volatile storage elements associated with a second group of word lines that include all odd word lines in the block, each parity bit of the second plurality of parity bits is calculated from data for a set of the non-volatile storage elements that includes one non-volatile storage element associated with each word line in the second group, the one or more managing circuits store the second plurality of parity bits in a second word line in the non-volatile storage device, in response to determining that a selected word line in the second group of word lines has a read error, the one or more managing circuits access the second plurality of parity bits from the second word line in the non-volatile storage device, read data in the non-volatile storage elements associated with all of the word lines in the second group but the selected word line, and recover data that was stored in non-volatile storage elements associated with the selected word line based on the second plurality of parity bits and the data read from the non-volatile storage elements associated with all of the word lines in the second group but the selected word line.

16. The non-volatile storage device of claim 9, further comprising a three dimensional memory array, wherein the plurality of non-volatile storage elements are within the three dimensional memory array.

17. A method of operating non-volatile storage comprising:
   programming a plurality of pages of data into non-volatile storage elements that are associated with a plurality of word lines and a plurality of bit lines in a memory array, the non-volatile storage elements being arranged as NAND strings, each of the pages is programmed into non-volatile storage elements associated with a single one of the word lines;
   for each corresponding bit of each of the pages, calculating a parity bit for the corresponding bit of each of the pages to generate a plurality of parity bits, each parity bit is for a group of the non-volatile storage elements that are associated with a single one of the bit lines;
   storing the plurality of parity bits in non-voltage storage elements associated with a word line in the memory array other than the plurality of word lines;
   determining that a selected word line of the plurality of word lines has a read error that cannot be recovered using ECC correction based only on codes generated from data stored in the selected word line;
   accessing the plurality of parity bits from the other word line in the memory array;
   reading the pages of data from the non-volatile storage elements associated with all of the word lines in the plurality but the selected word line; and
   recovering a page of data for the selected word line based on the plurality of parity bits and the pages of data read from the non-volatile storage elements associated with all of the word lines in the group but the selected word line.

18. The method of claim 17, wherein the storing the plurality of parity bits in a word line in the memory array includes:
   storing the plurality of parity bits in a word line in the memory array that is dedicated to storing parity bits, the word line that is dedicated to storing parity bits is in the same block as the plurality of word lines.

19. The method of claim 17, further comprising:
   receiving a unit of data that includes the plurality of pages and other pages; and
   dividing the unit of data into a plurality of sections;
   storing parity bits in a separate word line for each of the plurality of sections, the parity bits that are stored in the word line in the memory array other than the plurality of word lines are for a first section of the plurality of sections.

20. The method of claim 17, wherein the non-volatile storage elements in a group for which one of the parity bits is formed span multiple blocks.

21. The method of claim 17, further comprising:
  determining that the plurality of parity bits should be calculated for the plurality of pages being programmed and other pages that have been previously been programmed in the memory array; and
  calculating the plurality of parity bits based on parity bits already stored in the word line other than the plurality of word lines if parity bits have already been stored for the other pages, otherwise reading data from non-volatile storage elements that store the other pages as a part of calculating the plurality of parity bits.

22. A non-volatile storage device, comprising:
  a plurality of non-volatile storage elements arranged as NAND strings in a three-dimensional memory array;
  a plurality of bit lines associated with the plurality of non-volatile storage elements;
  a plurality of word lines associated with the plurality of non-volatile storage elements; and
  one or more managing circuits in communication with the plurality of bit lines and the plurality of word lines, the one or more managing circuits program a plurality of pages of data into a set of the plurality of non-volatile storage elements, each of the pages is programmed into non-volatile storage elements associated with a single one of the plurality of word lines, for each corresponding bit of each of the pages the one or more managing circuits calculate a parity bit for the corresponding bit of each of the pages to generate a plurality of parity bits, each parity bit is for a group of the non-volatile storage elements that are associated with a single one of the bit lines, the one or more managing circuits store the plurality of parity bits in non-voltage storage elements associated with a first word line of the plurality of word lines, the one or more managing circuits detect that a selected word line of the plurality of word lines has a read error that cannot be recovered using ECC correction based only on codes generated from data stored in the selected word line, the one or more managing circuits access the plurality of parity bits from the first word line in response to detected the read error, the one or more managing circuits read the pages of data from the non-volatile storage elements associated with all of the programmed word lines but the selected word line, the one or more managing circuits recover a page of data for the selected word line based on the plurality of parity bits and the pages of data read from the non-volatile storage elements associated with all of the programmed word lines but the selected word line.

23. The non-volatile storage device of claim 22, wherein the one or more managing circuits receive a unit of data that includes the plurality of pages and other pages, the one or more managing circuits divide the unit of data into a plurality of sections, the one or more managing circuits store parity bits in a separate word line for each of the plurality of sections, the parity bits that are stored in the word line in the memory array other than the plurality of word lines are for a first section of the plurality of sections.

24. The non-volatile storage device of claim 22, wherein the one or more managing circuits determine that the plurality of parity bits should be calculated for the plurality of pages being programmed and other pages that have been previously been programmed in the non-volatile storage device, the one or more managing circuits calculate the plurality of parity bits based on parity bits already stored in the first word line if parity bits have already been stored for the other pages, otherwise the one or more managing circuits read data from non-volatile storage elements that store the other pages as a part of calculating the plurality of parity bits.

* * * * *